United States Patent [19]

Sjostedt et al.

[11] Patent Number: 5,403,062
[45] Date of Patent: Apr. 4, 1995

[54] PANEL JOINT FOR ADHESIVELY BONDED WALL PANELS

[75] Inventors: Robbie J. Sjostedt, Oregon; Brent G. Schaffer, Jamesville; James Tedesco, Janesville, all of Wis.

[73] Assignee: Stoughton Composites, Inc., Brodhead, Wis.

[21] Appl. No.: 65,925

[22] Filed: May 21, 1993

[51] Int. Cl.⁶ ............... B60R 27/00; B62D 33/00; E04C 2/30
[52] U.S. Cl. .................... 296/181; 296/191; 220/1.5
[58] Field of Search ............ 296/181, 183, 191, 901; 220/1.5; 105/396; 52/595, 630

[56] References Cited

U.S. PATENT DOCUMENTS

| | | | |
|---|---|---|---|
| 2,962,323 | 11/1960 | McBride | 296/28 |
| 3,003,810 | 10/1961 | Kloote et al. | 296/31 |
| 3,229,441 | 1/1966 | Heffner | 52/743 |
| 3,242,625 | 3/1966 | Tillinghast | 52/461 |
| 3,386,218 | 6/1968 | Scott | 52/309 |
| 3,561,633 | 2/1971 | Morrison et al. | 220/1.5 |
| 3,783,563 | 1/1974 | Moore | 52/11 |
| 3,854,620 | 12/1974 | Saidla | 220/1.5 |
| 4,078,348 | 3/1978 | Rothman | 52/309.7 |
| 4,730,428 | 3/1988 | Head et al. | 52/309.11 |
| 4,810,027 | 3/1989 | Ehrlich | 296/181 |
| 4,940,279 | 7/1990 | Abott et al. | 296/181 |
| 4,958,472 | 9/1990 | Ehrlich | 52/584 |
| 4,984,406 | 1/1991 | Friesen | 52/594 |
| 5,042,395 | 8/1991 | Wackerle et al. | 296/191 X |
| 5,140,913 | 8/1992 | Takeichi et al. | 105/397 |
| 5,178,292 | 1/1993 | Korzeniowski | 220/1.5 |
| 5,255,806 | 10/1993 | Korzeniowski et al. | 220/1.5 |

FOREIGN PATENT DOCUMENTS

| | | | |
|---|---|---|---|
| 2504236 | 10/1982 | France | 296/191 |
| 478688 | 11/1969 | Switzerland | 296/901 |
| 2152869 | 8/1985 | United Kingdom | 296/901 |

*Primary Examiner*—Dean J. Kramer
*Attorney, Agent, or Firm*—Michael, Best & Friedrich

[57] ABSTRACT

A vehicle body including top, bottom and opposite side walls each including a plurality of modular panel members adjoining one another in series relation. Each panel member is an integral pultrusion and includes a pair of spaced apart sheet members, a pair of spaced apart webs interconnecting the sheet members, and wedge-shaped male and female members that interfit with the male and female members of adjoing panel members. Adhesive material is provided at the joints between panel members to bond the panel members together. To prepare suitable bonding surfaces for the adhesive, fabric material can be pultruded as an integral part of the male and female members and peeled off prior to application of the adhesive to reveal clean, gritty textured surfaces.

20 Claims, 13 Drawing Sheets

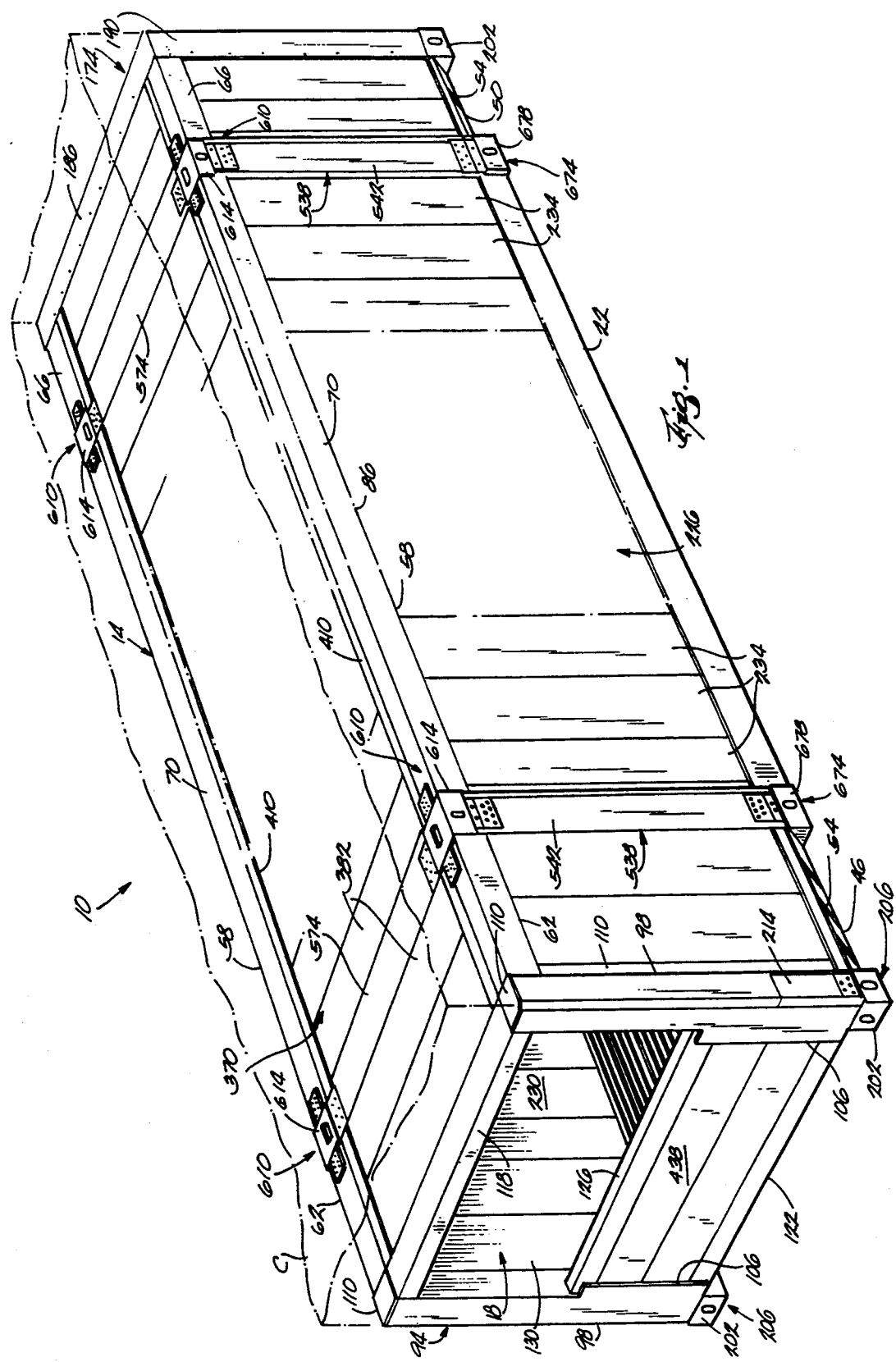

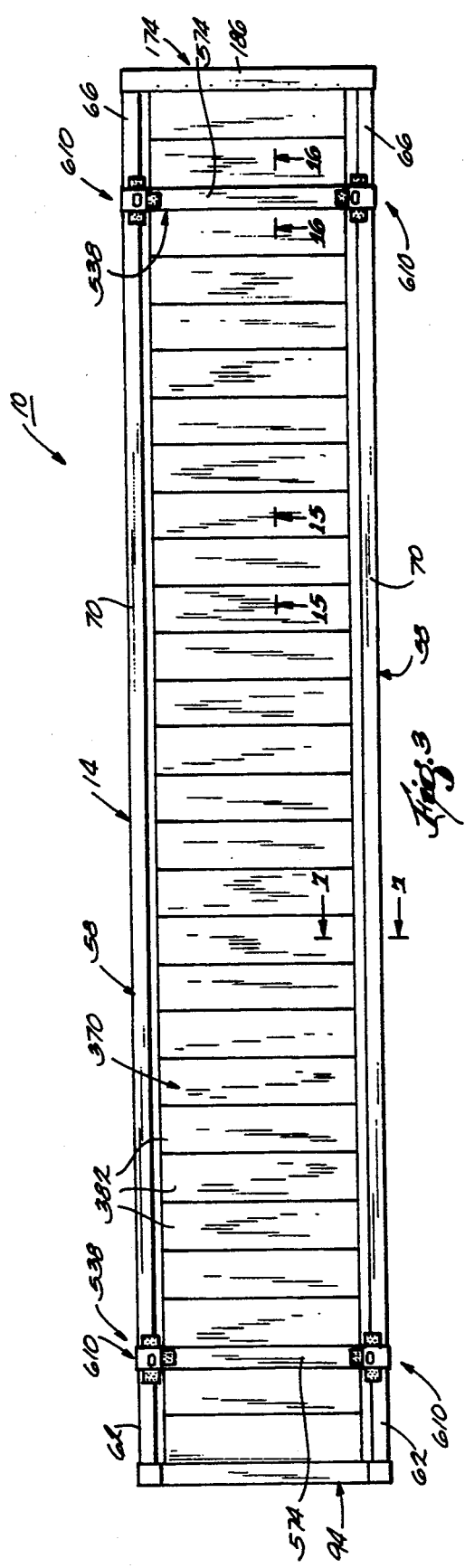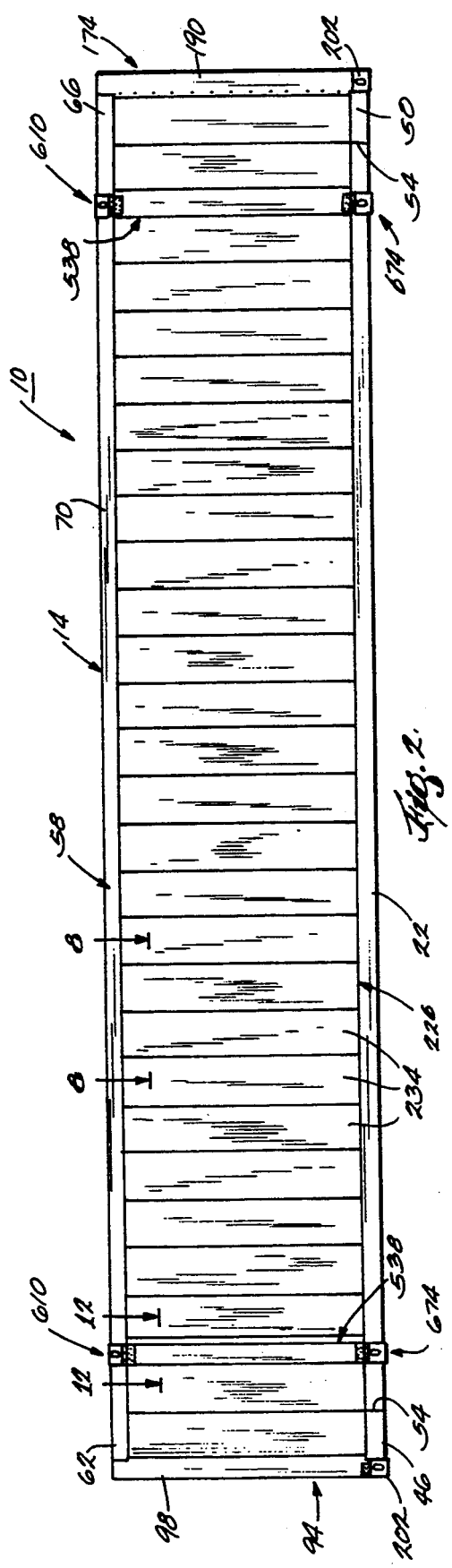

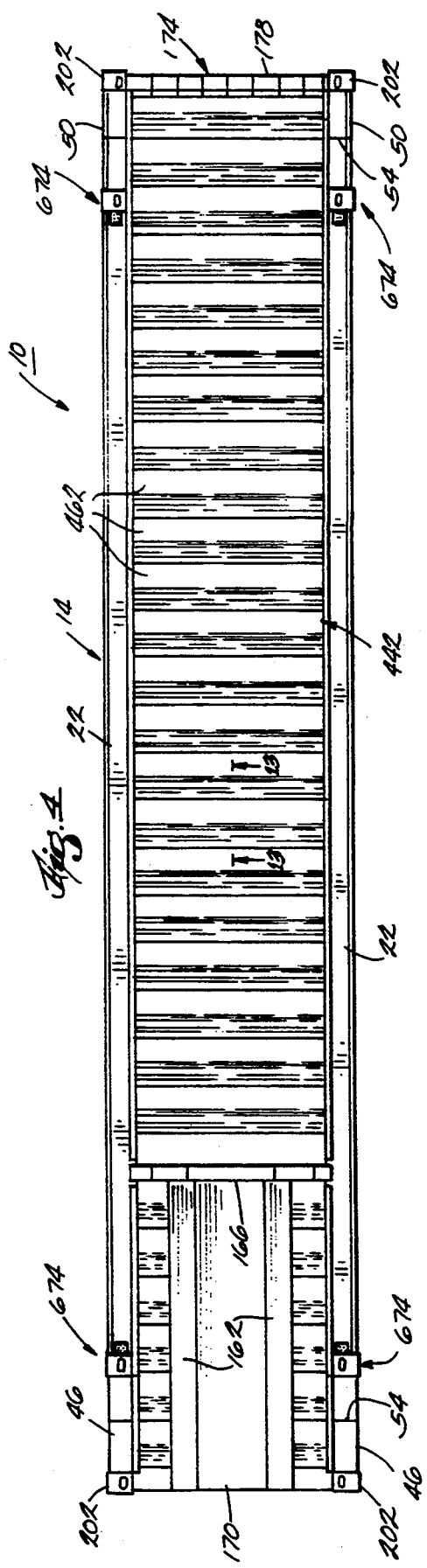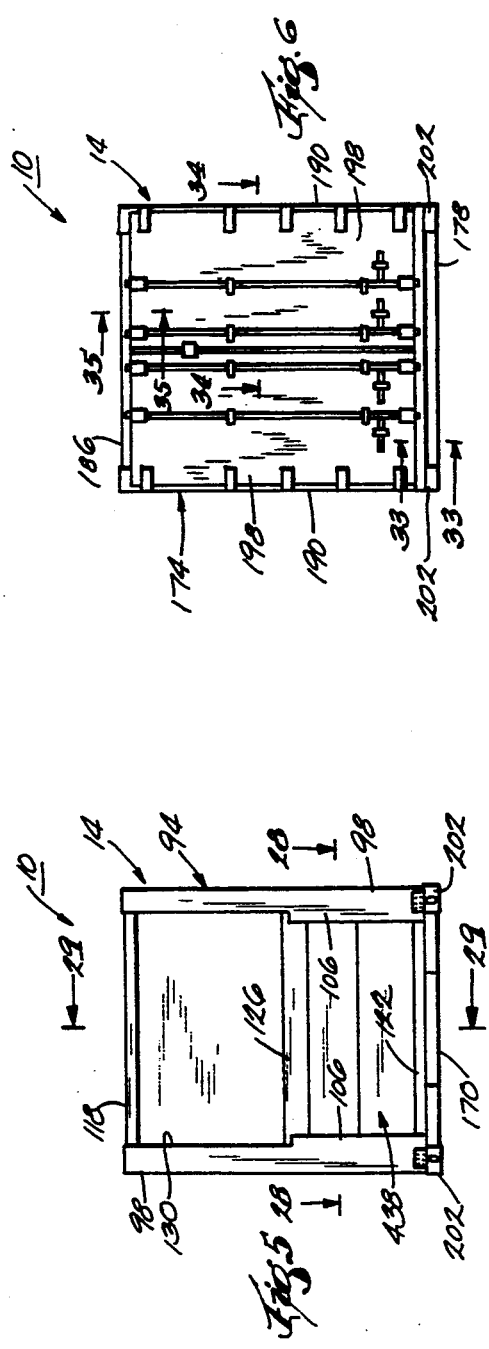

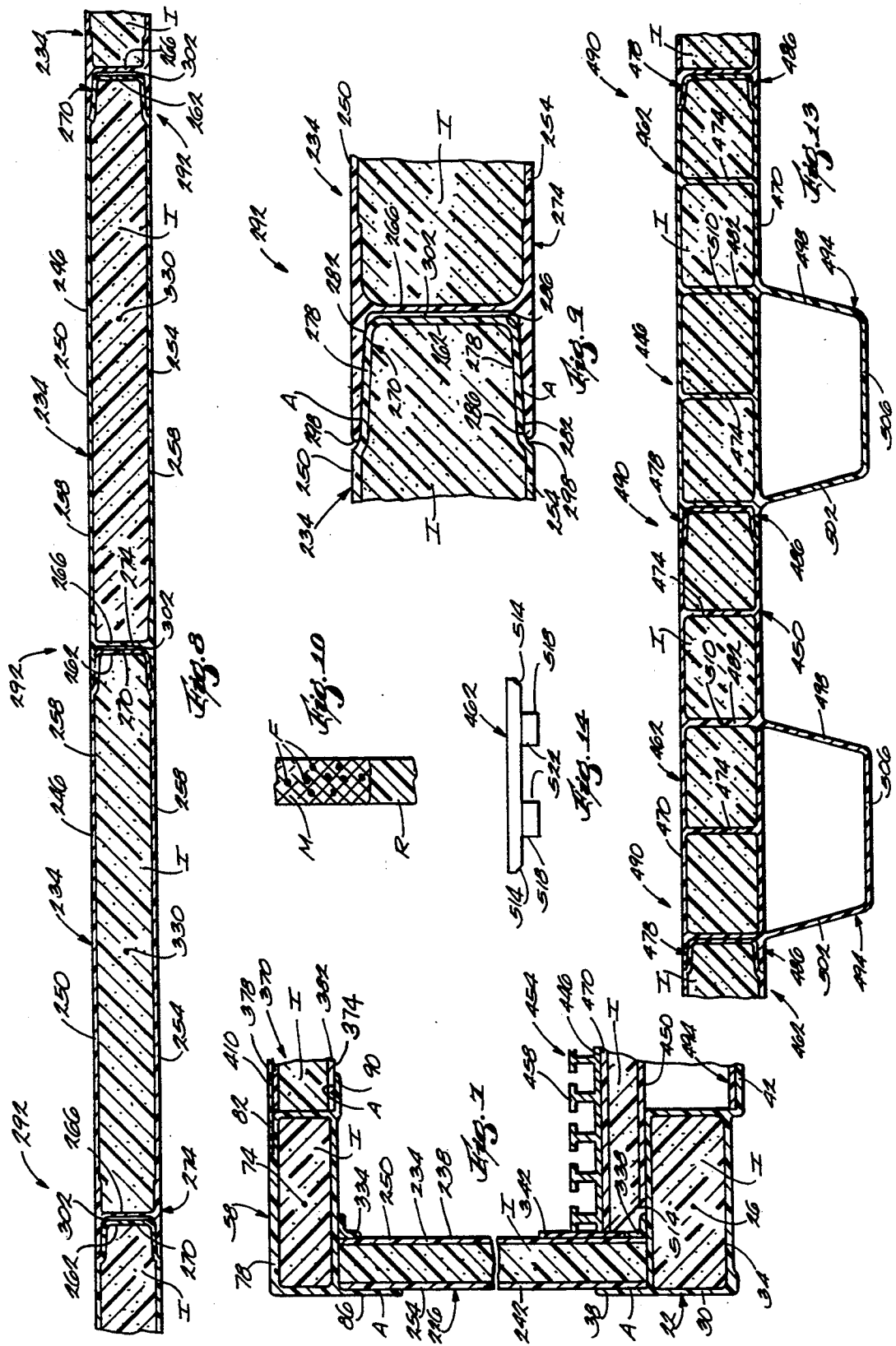

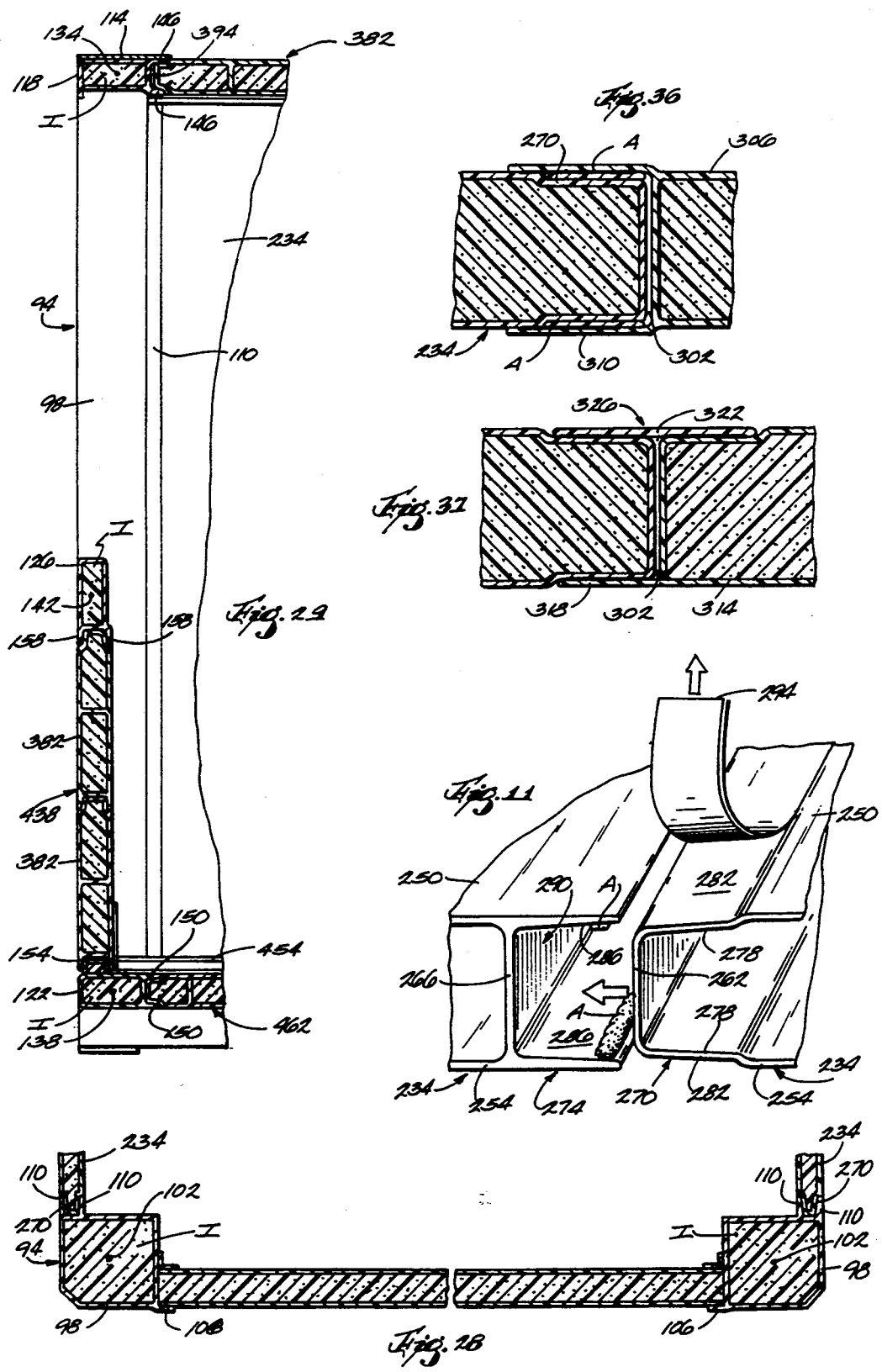

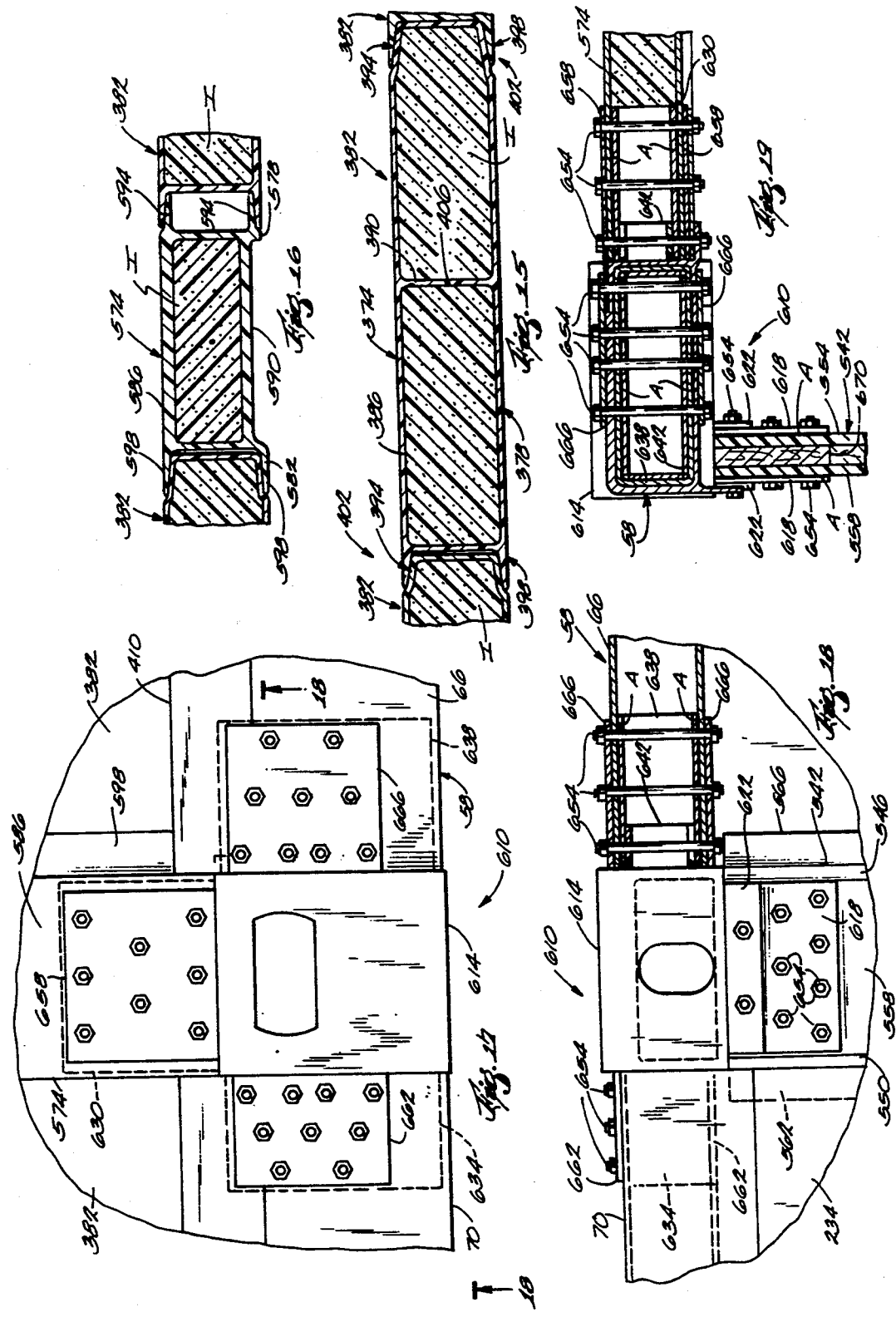

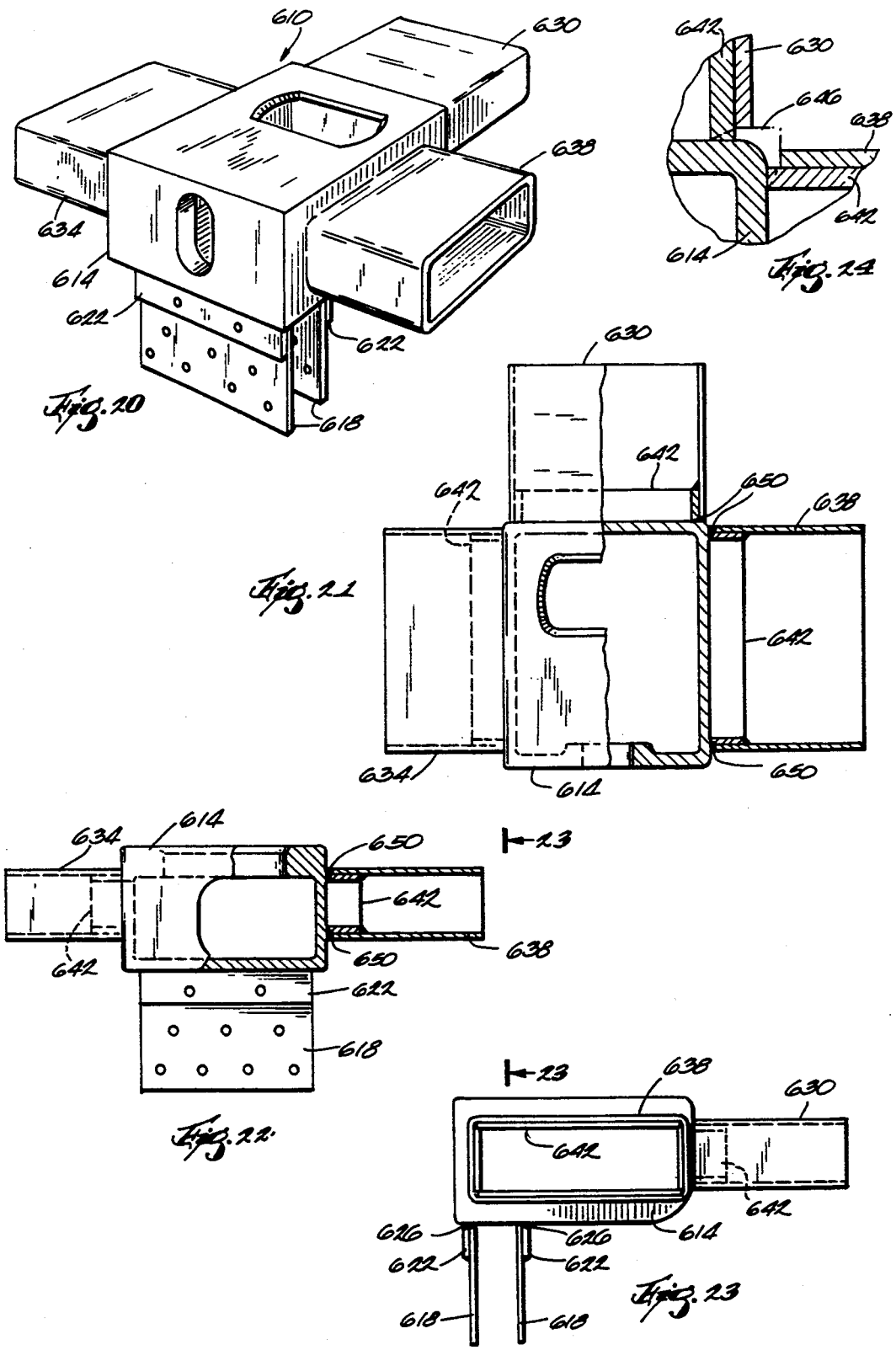

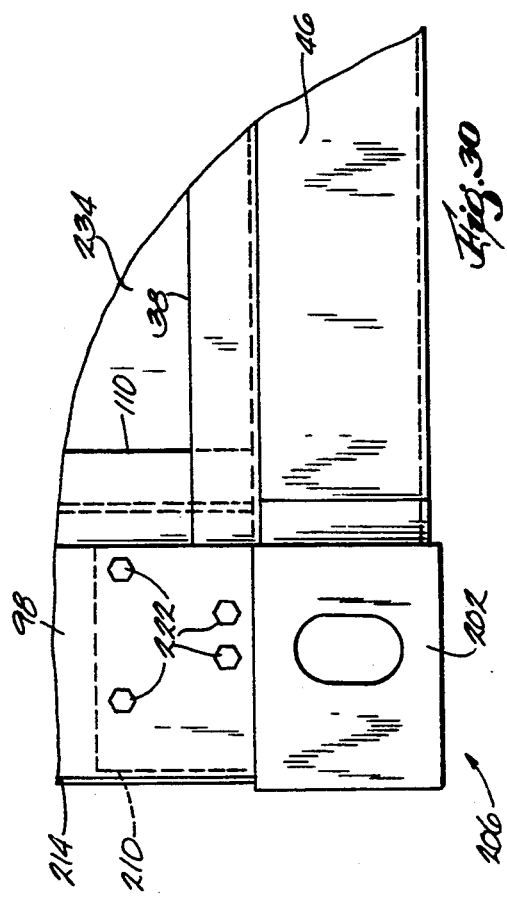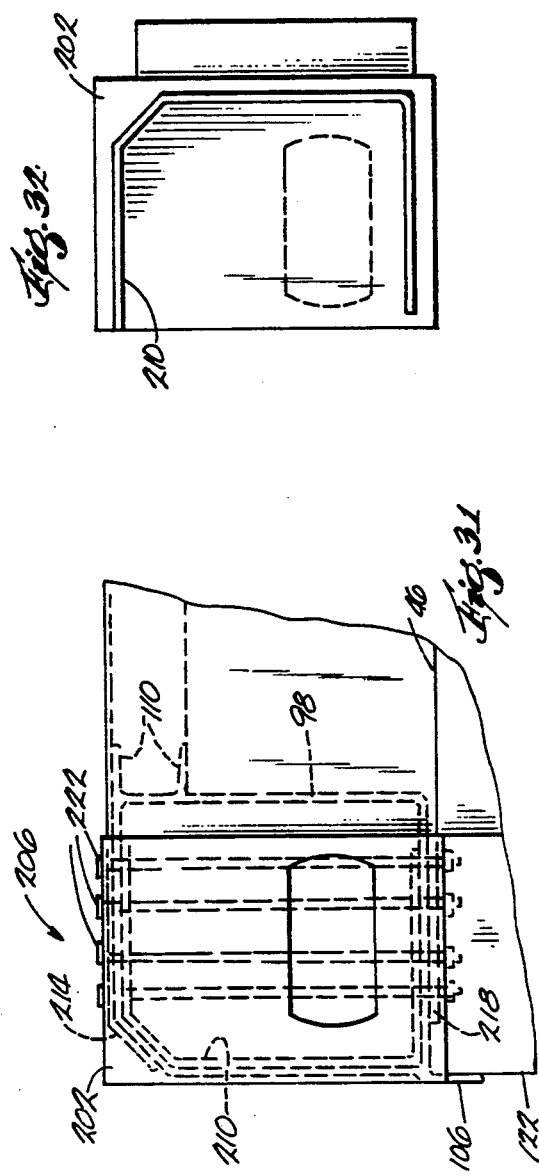

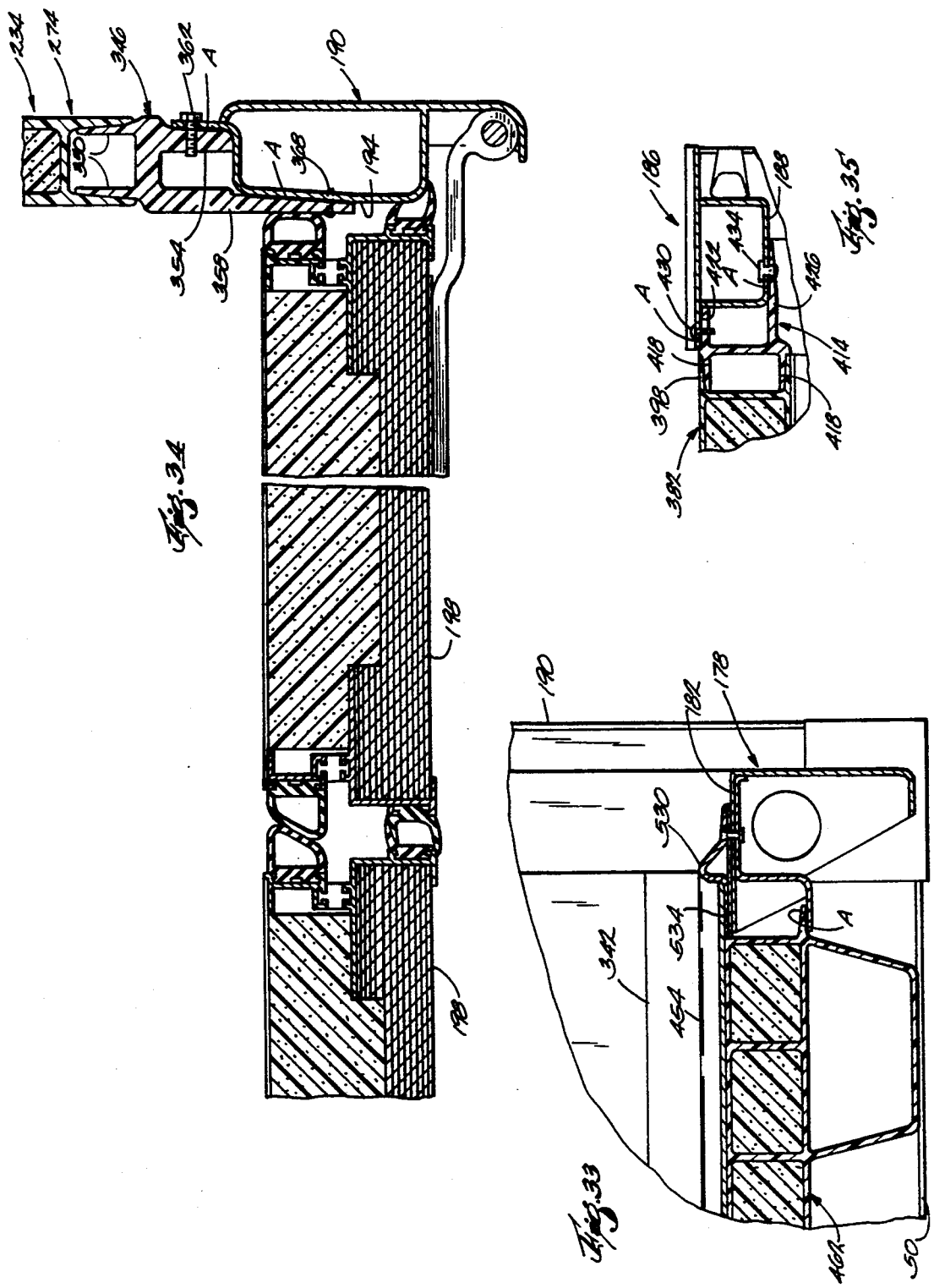

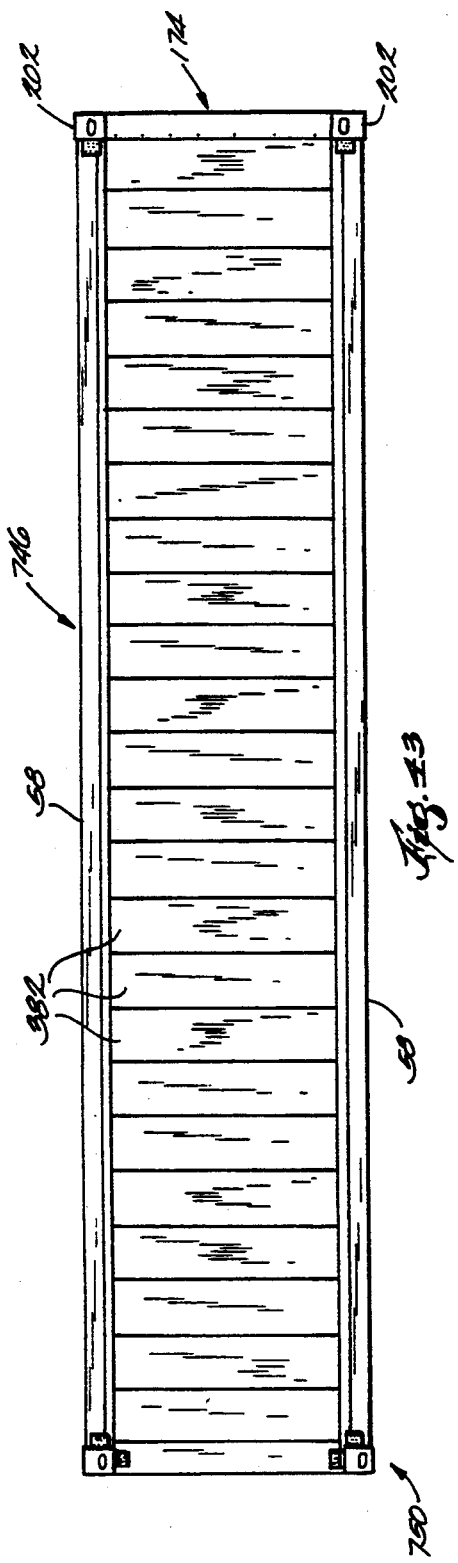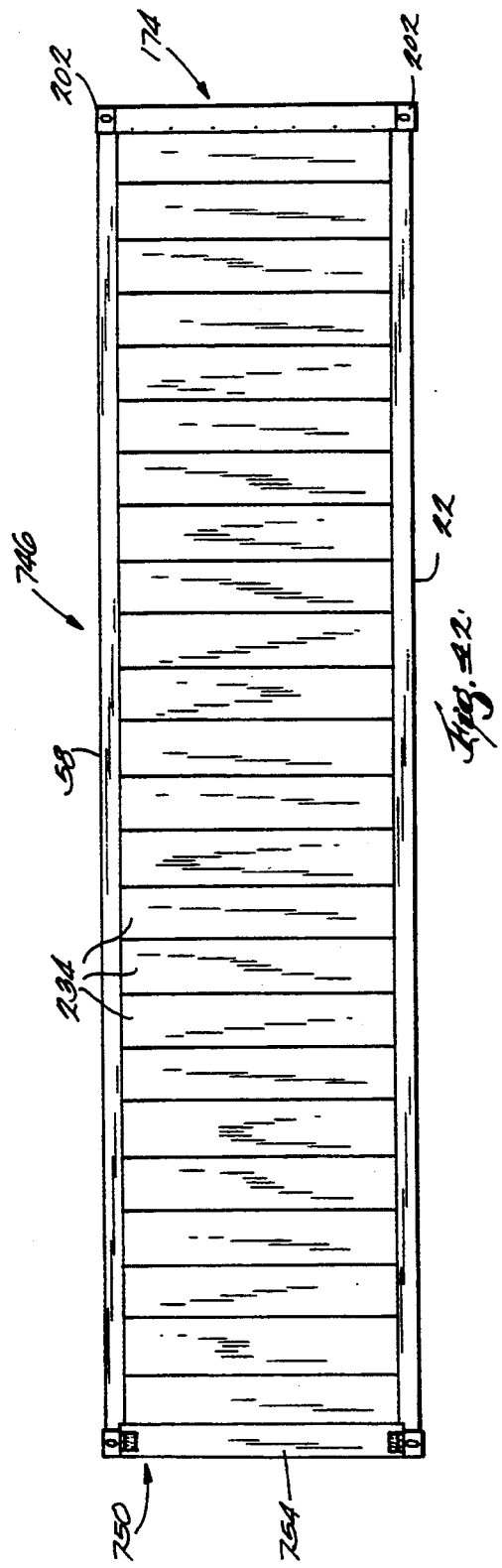

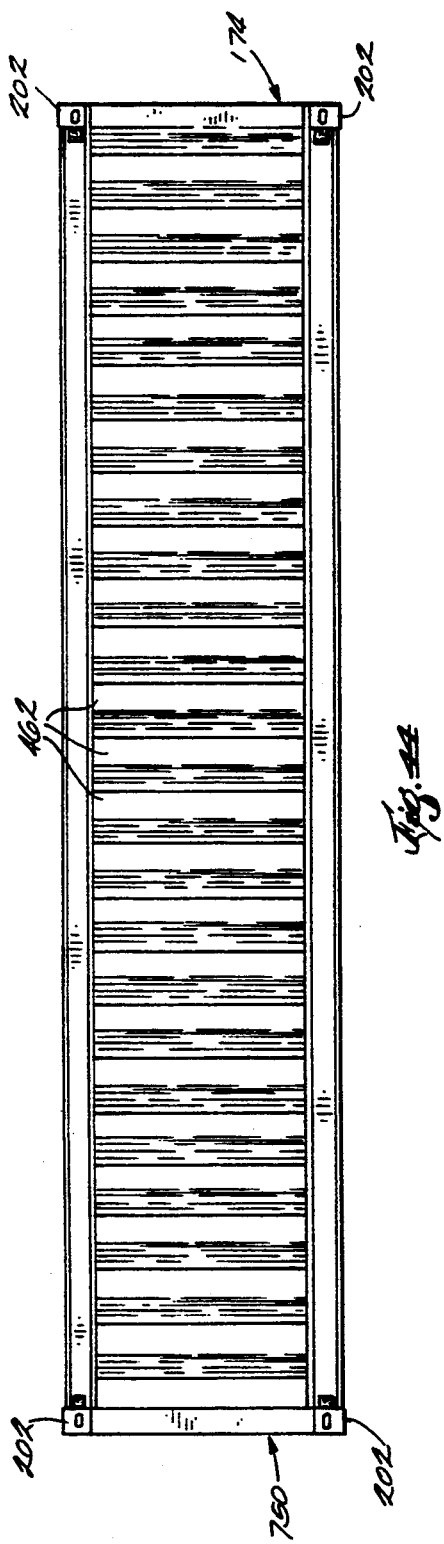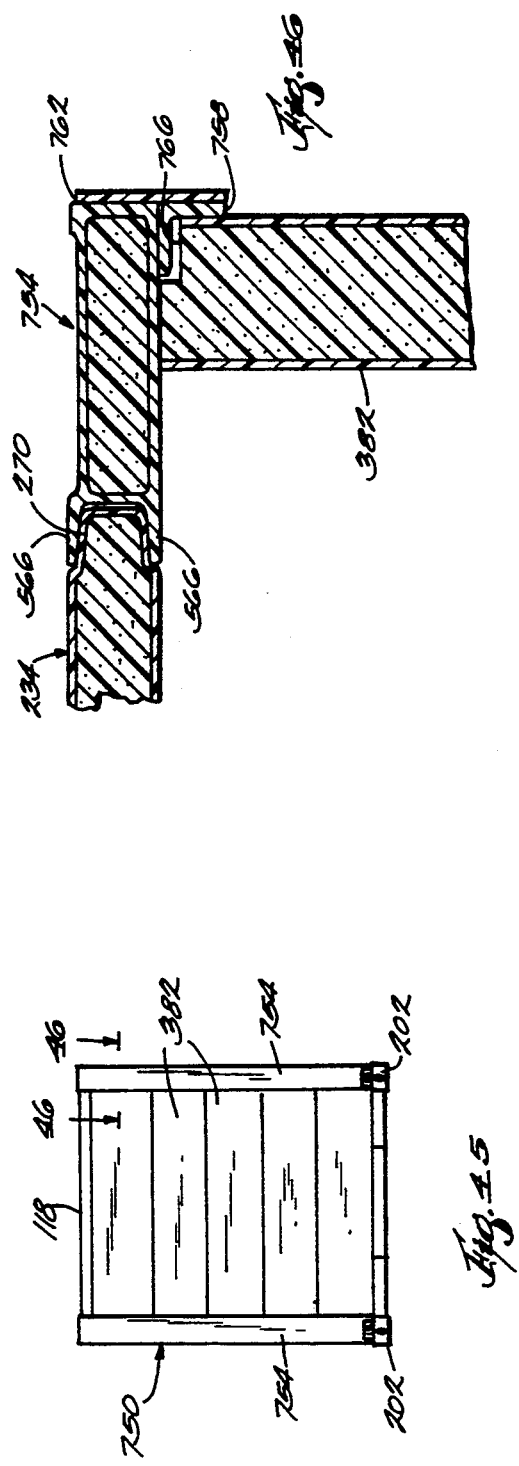

PANEL JOINT FOR ADHESIVELY BONDED WALL PANELS

BACKGROUND OF THE INVENTION

1. Field of the Invention

The invention relates generally to wall structures in vehicle bodies, and more particularly to the joints formed between adjoining wall panels that are adhesively bonded together to make up the wall structure.

2. Reference to Prior Art

Wall structures including interconnected panels having male members which are insertable into female members of adjoining panels are known. An example of such a wall structure is illustrated in U.S. Pat. No. 3,386,218 issued Jun. 4, 1968 to Scott. The building panels illustrated in that patent include insulating cores sandwiched between metal sheets. The panels also include female edge portions and male edge portions provided with a mechanical edge gasket. The gasket is intended to seal the joint between adjoining panels when the panels are fitted together prior to being fastened to the framing of a building. Other examples of wall panels having interfitting members that form joints between adjacent panels are provided in U.S. Pat. No. 4,730,428 issued Mar. 15, 1978 to Head et al. and U.S. Pat. No. 4,078,348 issued Mar. 14, 1978 to Rothman.

Other known wall panel joints are illustrated in U.S. Pat. No. 2,962,323 issued Nov. 29, 1960 to McBride and U.S. Pat. No. 3,003,810 issued Oct. 10, 1961 to Kloote et al. The McBride patent illustrates a trailer including wall panels provided with a 90° rabbet and tongue arrangement to form rabbetted joints with adjoining panels. A sealing material is provided at each joint to seal the rabbet and cooperating tongue. The Kloote et al. patent illustrates a trailer having walls including panels that are adhesively bonded to a spline inserted between adjacent panels to interconnect those panels.

SUMMARY OF THE INVENTION

The invention provides a wall construction including adhesively bonded modular panels interconnected by improved joints. The joints are configured to facilitate accurate, trouble-free panel fit-up to ease assembly of the wall and to provide a sealed, long lasting bond between adjoining panels. The joints are capable of withstanding static and repeated dynamic loading in harsh environments such as those encountered when the wall assembly forms part of a vehicle body such as a trailer, truck body or shipping container.

More particularly, the joint is formed by interfitting male and female members extending lengthwise along the opposite sides of adjoining panels, and by a layer of adhesive between those members. The male and female members include complementary mating surfaces that are preferably tapered to provide an interference fit therebetween that increases resistance as the male member of one panel is inserted into the corresponding female member of an adjoining panel. The complementary tapered surfaces of the joint are configured to provide a consistent fit-up between adjoining panels and to achieve consistent, uniform wall lengths despite the application of excess adhesive. The interference fit also prevents the male member from being inserted entirely into the female member, thereby forming a gap or space in the interior of the joint.

The panels are, in one embodiment, hollow and are filled with an insulating material. The interior space at each joint acts as a guide for a cutting tool so that, in the event of damage to a panel, that panel can be separated from adjoining panels without intruding into the hollow interior of the undamaged panels. Such intrusion can leave sites for moisture incursion into the panels or could otherwise compromise the effectiveness of the insulation.

In prior art joint configurations, excess adhesive material trapped between the end of a male member and the base of a female member can prematurely limit the degree of insertion of the male member into the female member, resulting in inexact fit-up between adjoining panel members. The aforementioned space also acts as an adhesive reservoir for excess adhesive material so that the interference fit between the male and female members, and not the presence of excess adhesive material, controls the degree of insertion of the male member. Excess adhesive reservoirs are also provided at the exterior edges of the joint.

The complementary tapered surfaces of corresponding male and female members in the joint of the present invention also combine to distribute adhesive material evenly therebetween to ensure proper bonding and sealing at the joint. In this regard, the tapered surfaces function to dispense or spread adhesive material into a uniform layer and to avoid adhesive wipe-off which otherwise can occur in prior art arrangements employing male and female members having squared 90° corners.

To achieve a long lasting adhesive joint, it is necessary that the complementary tapered surfaces on corresponding male and female members be clean and preferably slightly roughened. In one embodiment, the panels are pultruded and are integrally formed with a fabric strip over the tapered surfaces of the male and female members thereon. The fabric strips conveniently extend in the direction of the axis of pultrusion of the panels. Prior to interfitting adjoining panels, the fabric strips are peeled off to reveal clean adhesive bonding surfaces having a somewhat gritty texture.

The invention also provides a vehicle body including a plurality of wall assemblies interconnected to define an interior space. Each wall assembly includes a plurality of modular composite panel pultrusions adjoining one another in series relation to form joints therebetween. Each panel pultrusion includes a pair of spaced apart sheet members, a pair of spaced apart webs integrally interconnecting the sheet members, and integral means for interfitting with adjoining panel pultrusions. In one embodiment, the interfitting means of each panel pultrusion includes an integral lengthwise extending female member including one of the webs and a pair of opposite tapered surfaces converging inwardly to that web. The interfitting means also includes a complementary integral lengthwise extending wedge-shaped male member including the other web and a pair of opposite tapered surfaces converging inwardly to that other web. To interconnect the panel pultrusions, the male member of each panel pultrusion is inserted into a corresponding female member of another panel pultrusion. Adhesive material is provided at the panel joints to bond adjoining panel pultrusions together.

Various other features and advantages of the invention will become apparent to those skilled in the art upon review of the following detailed description, claims and drawings.

BRIEF DESCRIPTION OF THE DRAWINGS

FIG. 1 is a perspective view of an intermodal shipping container embodying various features of the invention.

FIG. 2 is a reduced side elevational view of the container illustrated in FIG. 1.

FIG. 3 is a top plan view of the container illustrated in FIG. 2.

FIG. 4 is a bottom plan view of the container illustrated in FIG. 2.

FIG. 5 is a front elevational view (taken from the left in FIG. 2) of the container.

FIG. 6 is a rear elevational view (taken from the right in FIG. 2) of the container.

FIG. 7 is an enlarged view taken along line 7—7 in FIG. 3.

FIG. 8 is an enlarged view taken along line 8—8 in FIG. 2 and showing interconnected wall panels forming a portion of a side wall of the container.

FIG. 9 is a further enlarged view of a portion of the side wall illustrated in FIG. 8 and showing a joint between adjoining wall panels.

FIG. 10 is a still further enlarged view of a portion of one of the wall panels illustrated in FIG. 9.

FIG. 11 is a perspective view showing assembly of a pair of wall panels to form a joint such as is illustrated in FIG. 9.

FIG. 12 is an enlarged view taken along line 12—12 in FIG. 2 and showing a portion of a side wall of the container including a stacking post.

FIG. 13 is an enlarged view taken along line 13—13 in FIG. 4 and showing interconnected wall panels forming a portion of the bottom wall of the container.

FIG. 14 is a side elevational view of one of the wall panels shown in FIG. 4.

FIG. 15 is an enlarged view taken along line 15—15 in FIG. 3 and showing interconnected wall panels forming a portion of the top wall of the container.

FIG. 16 is an enlarged view taken along line 16—16 in FIG. 3 and showing a portion of the top wall of the container including a horizontal beam.

FIG. 17 is an enlarged view of a portion of the container illustrated in FIG. 3 and showing a top intermediate connector installation.

FIG. 18 is a view taken along line 18—18 in FIG. 17.

FIG. 19 is a cross-sectional view of the top intermediate connector installation.

FIG. 20 is a perspective view of the top intermediate connector assembly forming part of the installation illustrated in FIG. 17.

FIG. 21 is a top plan view, partially cut away and in section, of the top intermediate connector assembly.

FIG. 23 is a view taken along line 23—23 in FIG. 22.

FIG. 24 is an enlarged view of a portion of the top intermediate connector assembly illustrated in FIG. 21 and showing that portion prior welding that assembly together.

FIG. 28 is a view taken along line 28—28 in FIG. 5 and shows an enlarged cross-sectional view of the front of the container.

FIG. 29 is a view taken along line 29—29 in FIG. 5 and shows another enlarged cross-sectional view of the front of the container.

FIG. 30 is an enlarged view of a portion of the container illustrated in FIG. 2 and showing a front corner connector installation.

FIG. 31 is a bottom plan view of the front corner connector installation illustrated in FIG. 30.

FIG. 32 is a top plan view of the front corner connector assembly forming part of the installation illustrated in FIG. 30.

FIG. 33 is an enlarged view of the rear door frame of the container taken along line 33—33 in FIG. 6.

FIG. 34 is an enlarged view of the rear door frame taken along line 34—34 in FIG. 6.

FIG. 35 is an enlarged view of the rear door frame and doors taken along line 35—35 in FIG. 6.

FIG. 36 is an enlarged view similar to FIG. 9, but showing a splice joint configuration wherein a replacement panel has been installed.

FIG. 37 is a view similar to FIG. 36 and showing an alternative splice joint configuration.

FIG. 42 is a side elevational view of an alternative container construction.

FIG. 43 is a top plan view of the container illustrated in FIG. 42.

FIG. 44 is a bottom plan view of the container illustrated in FIG. 42.

FIG. 45 is a front view (taken from the left in FIG. 42) of the container.

FIG. 46 is an enlarged view of a portion of the container taken along line 46—46 in FIG. 45.

Figure 22:
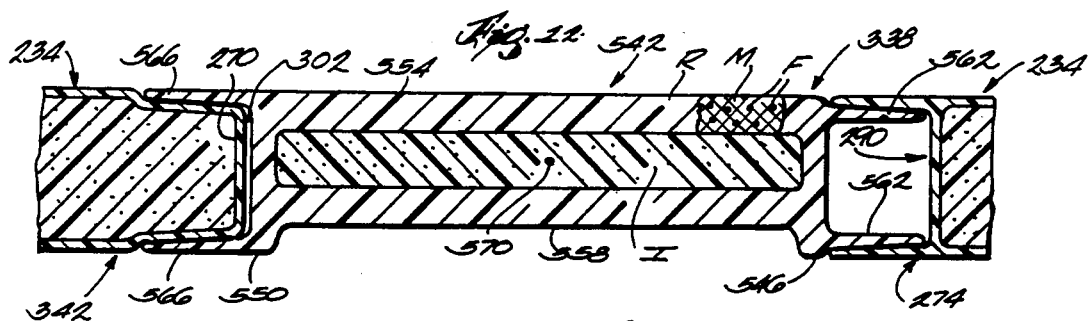
FIG. 22 is a side elevational view, partially cut away and in section, of the top intermediate connector assembly.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Illustrated in the drawings is a vehicle or container body embodying the invention. The container body can be integrated into a variety of freight hauling vehicles, such as to serve as a trailer or truck body, a railroad car body, a freight shipping container, or the like. In the illustrated embodiment, the container body is a shipping container 10. More particularly, the shipping container 10 illustrated in FIGS. 1–6 is an insulated intermodal domestic container having a length of about 48 feet and a width of about 96 inches. However, as will be apparent to those skilled in the art, the invention is applicable to container bodies of various sizes and to insulated or uninsulated container bodies.

As shown in FIGS. 1–6, the container comprises a frame 14 on which walls are mounted, as is further explained below, to form a box-like structure defining (FIG. 1) a cargo receiving interior space 18. The frame 14 includes (FIG. 4) a pair of lower longitudinal members or rails 22. Referring to FIG. 7, each lower rail 22 (only one is shown in FIG. 7) includes a longitudinally extending axis 26 and a tubular portion 30 having a recessed lower surface 34. In the illustrated embodiment, the tubular portion 30 is filled with an insulating material I, such as expanded foam insulation for example. Each lower rail 22 also includes an upwardly extending outer flange 38 and an inwardly extending lower flange 42 that is downwardly offset relative to the lower surface 34.

As shown in FIGS. 1, 2 and 4, each lower rail 22 is provided with front and rear rail sections 46 and 50 at its opposite ends. The rail sections 46 and 50 are preferably shaped identically to the lower rail 22 minus the two outwardly exposed sides (as seen in FIG. 7) of the tubular portion 30. The rail sections 46 and 50 are made of metal and are provided with stiffening gussets 54.

The frame 14 also includes (FIG. 3) a pair of upper longitudinal members or rails 58 parallel to the lower rails 22. To accommodate lock receiving fittings, as is more fully explained hereinafter, the upper rails 58 are each cut into sections including (FIGS. 1–3) front, rear, and central sections 62, 66, and 70, respectively. Referring again to FIG. 7, each upper rail 58 (only one is shown in FIG. 7) includes a longitudinally extending axis 74 and a tubular portion 78. The tubular portion 78 is filled with insulation I and has a recessed upper surface 82. Each upper rail 58 also includes a downwardly extending outer flange 86 and an inwardly extending lower flange 90 that is slightly downwardly offset relative to the bottom side of the tubular portion 78.

The frame 14 also includes lateral members, several of which are assembled (FIGS. 1–5) into a front frame assembly 94. The front frame assembly 94 includes opposite vertically extending front corner posts 98. As shown in FIG. 28, each corner post 98 is hollow and has a longitudinally extending axis 102. Each corner post 98 also includes an inwardly extending flange 106 and a set of vertical flanges 110 that project rearwardly (i.e., upwardly in FIG. 28). The flanges 110 have opposed inwardly facing tapered surfaces that form a female member capable of interfacing with a side wall of the container 10, as is further explained below, and the upper end portions of the flanges 110 are removed to accommodate the tubular portions 78 of the upper rails 58. The corner posts 98 are also filled with insulation I, and post caps 114 (FIG. 1) are adhesively sealed over the top of each post.

The front frame assembly 94 also includes (FIGS. 1 and 5) upper, lower and intermediate beams 118, 122 and 126, respectively. Those beams extend between the corner posts 98 and are preferably adhesively bonded and sealed thereto. In the illustrated embodiment, the intermediate beam 126 is spaced sufficiently below the upper beam 118 to provide an opening 130 (FIG. 5) for a refrigeration unit (not shown).

As shown in FIG. 29, the upper, lower and intermediate beams 118, 122 and 126 have respective longitudinally extending axes 134, 138, and 142, and are hollow to also receive insulation I. The upper and lower beams 118 and 122 are provided with sets of rearwardly extending flanges 146 and 150, respectively. The flanges 146 and 150, like the flanges 110 on the corner posts 98, form female members which are adapted to interface with top and bottom walls of the container 10, respectively. The lower and intermediate beams 122 and 126 also include a male member 154 and a set of downwardly extending flanges 158, respectively, that are adapted to interface with a front wall as explained below.

While the frame members thus far discussed can be made of any suitable material such as metal for example, in the illustrated arrangement each of those members, except for the rail sections 46 and 50, is made of composite material such as fiber reinforced plastic. It is also preferred that those components be integrally made as unitary pultrusions. Pultrusion apparatus and methods known in the art are disclosed in U.S. Pat. No. 3,769,127 issued Oct. 30, 1973 to Goldsworthy et. al., and in U.S. Pat. No. 3,556,888 issued Jan. 19, 1971, and U.S. Pat. No. 2,871,911 issued Feb. 3, 1959, both to Goldsworthy, all of which are incorporated herein by reference. Briefly, the pultrusion process involves passing fibrous material through a resin bath and pulling the resulting composite through a die wherein the material is formed into the desired shape and cured. Thereafter, the resulting continuous pultrusion is cut into desired lengths.

The composite material used to produce the aforementioned composite frame components preferably includes a resin binder material, such as polyester resin which is sold by Owens-Corning as Model No. E606-6-12. Other suitable resins include, for example, various polyesters, polypropylenes, phenolics, epoxies, and polycarbonates. The resin material can, if desired, be colored to eliminate the need for painting. The composite material also preferably includes a multi-directional array of filamentary material dispersed throughout the cross-section of the pultrusion. A suitable filamentary material is known in the industry as 113E-glass roving. Possible filamentary material substitutes include, for example, glass fibers known in the industry as E-, S-, S2- and A-glass fibers, as well as carbon, graphite, boron, and quartz fibers.

The composite material is as much as several hundred times less thermally conductive than metal, and possesses the necessary structural properties to withstand the loads encountered when used in a shipping container or other vehicle body. In both regards, Applicant has recognized the advantages that can be achieved by forming composite container components using the pultrusion process. In particular, the pultrusion process is well suited for producing products having multi-directional fiber arrays with a predominance of fibers being oriented in a direction parallel to the axis of pultrusion (i.e., the longitudinally extending axes of the products). Pultrusions with that fiber orientation possess desirable thermal and structural properties. In particular, that fiber orientation stiffens the pultrusion to improve load carrying ability in the longitudinal or lengthwise direction. Also, thermal flux across the pultrusion in a direction transverse to the pultrusion axis is restricted since it is primarily controlled by the thermal conductivity of the resin which is much lower than that of the fibers.

In the particular embodiment illustrated in FIGS. 1–6, the intermodal container 10 is useable as a trailer body and the frame 14 is provided with means for accommodating a trailer chassis (not shown). As shown in FIG. 4, the chassis accommodating means includes a pair of spaced apart steel rails 162 extending rearwardly from the front of the container 10 and a steel crossmember 166 welded across the rear ends of the steel rails 162 to provide a channel 170. A chassis is receivable in the channel 170 in a known manner that is not further discussed.

The frame 14 also includes (FIG. 6) a rear door frame 174. In the particular embodiment illustrated in the drawings, the door frame 174 is a welded steel structure including a lower crossmember 178 providing (FIG. 33) a lower door sill 182. The door frame 174 also includes an upper crossmember 186 providing (FIG. 35) an upper door sill 188, and opposite rear corner posts 190 (one is shown in FIG. 34) interconnecting the upper and lower crossmembers 176 and 178 and providing side door sills 194.

To facilitate loading and unloading of the container 10 a set of insulated doors 198 (FIG. 6) are mounted on the rear door frame 174. While in the illustrated arrangement the doors 198 are standard, in other arrangements the doors 198 can be constructed, for example, by pultruding hollow composite door panels or shells (not shown) and filling those panels with expanded foam insulation. The thermal advantages of such a construction are mentioned above and are further explained below in connection with the discussion of the walls of the container 10.

To facilitate attachment of the container 10 to a supporting surface, such as the aforementioned trailer chassis for example, the frame 14 is also provided with corner fittings 202 at the lower front and rear corners of the container 10. The corner fittings 202 are preferably standard fittings meeting the specifications of the Association of American Railroads, and are configured to receive standard locking elements (not shown), such as those disclosed in U.S. Pat. No. 4,626,155 issued Dec. 2, 1986 to Hlinsky et al. The corner fittings 202 at the rear of the container 10 form part of the rear door frame 174 and are welded in position at the intersections of the lower crossmember 178 and the rear corner posts 190, and are also welded to the rear sections 50 of the lower rails 22. The corner fittings 202 at the front of the container 10 are positioned at the base of the corner posts 98 and are included as part of a front corner connector assembly 206.

Referring to FIGS. 30-32, each front corner connector assembly 206 (only one is shown) is provided with means for attaching a corner fitting 202 to one of the corner posts 98. While various corner fitting attaching means can be employed, in the illustrated arrangement such means includes an angled member 210 welded to the top of the corner fitting 202 and inserted upwardly into the corner post 98. The angled member 210 is shaped to be somewhat snugly received within the corner post 98 to form a telescopic lap joint, and an adhesive material (not shown) is preferably applied between the angled member 210 and the interior surface of the corner post 98. The adhesive material fixes the corner fitting 202 with respect to the corner post 98. In the illustrated arrangement, optional clamping means, such as a pair of clamping plates 214 and 218 positioned on opposite sides of the corner post 98 and secured in place with fasteners 222, is provided to reinforce the adhesive joint. Each of the corner fittings 202 at the front of the container 10 are also secured to one of the front sections 46 of one of the lower rails 22, such as by welding.

As shown in FIG. 1, the container 10 also comprises roadside and curbside side walls 226 and 230 that are preferably identical. Each of the sidewalls 226 and 230 is constructed of a plurality of modular side panels 234 adjoining one another in series relation to provide a wall structure of substantially uniform thickness having (see FIG. 7) interior and exterior surfaces 238 and 242 that preferably occupy parallel planes.

As shown in FIG. 8, each side panel 234 includes a panel member 246 which in the illustrated arrangement is an integrally formed hollow shell. The panel member 246 includes a pair of spaced apart and opposed skins or sheet members 250 and 254 each having an exposed outer surface 258 that forms part of either the interior surface 238 or the exterior surface 242 of one of the side walls. Each panel member 246 also includes outer end webs 262 and 266 integrally interconnecting the sheet members 250 and 254 to form opposite lateral sides of the panel member 246.

In the particular embodiment illustrated in the drawings, each side panel 234 is provided with a core of insulating material which is also preferably expanded foam insulation I. The insulation I, once expanded, fills the entire interior of the panel member 246 and bonds to the sheet members 250 and 254. To preserve the integrity of that bond, each panel member 246 is provided with means for stopping or preventing delamination of the sheet members 250 and 254 from the insulation I. While other delamination preventing means can be employed, in the illustrated arrangement delamination is prevented by end webs 262 and 266 which are load bearing to carry shear loads that might otherwise act to separate the sheet members 250 and 254 from the insulation I. To avoid moisture intrusion into the interior of the panel members 246, the webs 262 and 266 also act as a means for sealing the interior of the panel member 246 and for preventing crosspanel migration of fluids. Thus, if one of the side walls 226 and 230 is damaged and cannot be immediately repaired, damage propagation to side panels 234 adjoining the damaged area is prevented. The replacement of damaged panels 234 is further explained below.

Each of the side walls 226 and 230 is also provided with means for interconnecting or joining adjacent side panels 234. In the particular embodiment illustrated in the drawings the means for interconnecting the side panels 234 includes means on each side panel for interfitting with adjoining side panels 234 so that the planar interior and exterior surfaces 238 and 242 are not interrupted. While various interfitting means can be employed, in the illustrated arrangement such means is integrated into each panel member 246 and includes complementary male and female members 270 and 274, respectively. The male and female members 270 and 274 are integrally formed along the opposite lateral sides of each panel member 246 and extend along the length thereof.

As shown best in FIGS. 9 and 11, the male member 270 is generally wedge-shaped and is formed by inwardly offset portions 278 on the sheet members 250 and 254. Each portion 278 has an outwardly facing tapered surface 282, and the tapered surfaces 282 of each panel member 212 converge inwardly (in the laterally outward direction) to end web 262. The female member 274 is formed by a pair of opposed inwardly facing tapered surfaces 286 on the sheet members 250 and 254. The tapered surfaces 286 converge inwardly (in a laterally inward direction) to the end web 266 to define a wedge-shaped channel 290. The male member 270 of each side panel 210 is insertable into a corresponding female member 274 of an adjoining panel to form a joint 292 (see FIG. 9).

The aforementioned interconnecting means also includes means for bonding adjoining side panels 234 together. While various bonding means can be employed, the bonding means is preferably entirely confined between the interior and exterior surfaces 238 and 242 of the side wall so that those surfaces are not interrupted to provide a clean, smooth container appearance. The preferred bonding means includes (FIGS. 9 and 11) an adhesive material A applied at the joints 292, and in particular between the tapered surfaces 282 and 286 at the joint 292. The adhesive material A is preferably a methacrylate adhesive sold by ITW Adhesive Systems of Farmington Hills, Mich. as Model No. AO420. Adhesive Model No. AO20FF may also be used when a longer cure time is desired.

To insure a proper adhesive bond, the bonded surfaces must be clean prior to application of the adhesive material A. As is explained more fully hereinafter, the panel members 246 are preferably formed with fabric strips 294 (only one is shown in FIG. 11) over each of the tapered surfaces 282 and 286. Prior to application of the adhesive material A, the strips 294 are peeled away to provide clean, slightly roughened bonding surfaces.

The panel members 246 are also provided with means for dispensing adhesive material A between the directly opposed tapered surfaces 282 and 286 at each joint 292 without wiping the adhesive material A from between the tapered surfaces 282 and 286. In the illustrated arrangement, the dispensing means includes the complementary shapes of the male and female members 270 and 274. In particular, prior to fit-up the fabric strips 294 are removed from a corresponding pair male and female members 270 and 274 and adhesive material A is preferably laid (FIG. 11) as a bead along the length of each of the tapered surfaces 286 of the female member 274. When the male member 270 is inserted into the female member 274, the adhesive beads are spread or rolled between the male and female members 270 and 274 to form (FIG. 9) substantially uniform and continuous bond lines that provide a double layer adhesive seal. The thickness of the layers of adhesive material A is controlled by the degree of insertion of the male member 270 and by the taper of the male and female members 270 and 274. Applicant has determined that the tapered surfaces 282 and 286 should preferably be from 3°–5° for optimum performance.

To further facilitate proper and accurate assembly of the side walls 226 and 230, each joint 292 is provided with means for controlling fit-up between adjoining side panels 234. The fit-up control means includes means defining excess adhesive reservoirs at the joint 292. The reservoirs are formed between the interfitted male and female members 270 and 274 and include (FIG. 9) spaces 298 and a cavity or air gap 302 between the end (i.e., the web 262) of the male member 270 and the base (i.e. the web 266) of the channel 290 of the corresponding female member 274. Excess adhesive material A in the joint 292 can be relieved into the spaces 298 or the cavity 302 so as not to interfere with accurate fit-up of adjoining side panels 234, and the spaces 298 permit convenient visual inspection of the joint 292. Thus, the possible presence of excess adhesive material A in the joint 292 will not affect fit-up of adjoining side panels 234.

The cavity 302, and particularly the opposed webs 262 and 266 of corresponding male and female members 270 and 274 forming the joint 292, provide means for guiding a suitable cutting tool such as a saw blade to facilitate separation of adjoining side panels 234. By separating adjoining side panels along the cavity 302, the integrity of the side panels 234 as sealed shells for insulation I is maintained. Thus, in the event one of the side panels 234 becomes damaged it can be quickly and easily cut from the corresponding side wall without compromising the structural or thermal performance of the adjoining side panels 234. The damaged side panel can then be replaced with (FIG. 36) a replacement panel 306 that is provided at its opposite ends with enlarged female members 310 (only one is shown). The female members 310 receive the adjoining panels and are bonded thereto with adhesive material A.

An alternative joint configuration is illustrated in FIG. 37. That arrangement includes a panel 314 having portions 318 (only is shown) and a separate splice plate 322 that receives therebetween one of the side panels 234 to form a splice joint 326. Adhesive material A is also used at the splice joint 326.

In the particular embodiment illustrated in the drawings, the panel members 246 act as structural members. While each panel member 246 can be made of a variety of materials, in a preferred embodiment the panel members 246 are made of the same composite material as the aforementioned frame components and are also formed by pultrusion. Like the pultruded frame members each panel member 246 includes (FIG. 8) a longitudinal pultrusion axis 330, and the filamentary material therein is preferably arranged in a multi-directional array and is dispersed throughout the cross-section of each panel member 246 to provide structural properties in all directions. However, the filamentary material is predominantly oriented parallel to the pultrusion axis 330 to improve load bearing in that direction and to increase resistance to thermal flux in a direction transverse to that direction (i.e., across the thickness dimension of the panel member 246). FIG. 10 shows a portion of one of the webs 262 and 266 to illustrate this filament arrangement. In particular, R represents the resin material, M represents fibers arranged in a multi-directional array, and F represents fibers arranged substantially parallel to the pultrusion axis 330.

As mentioned above, the panel members 246 include peel-away fabric strips 294 on the tapered surfaces 282 and 286, the strips 294 being removed prior to application of the adhesive material A to provide pre-prepared bonding surfaces. The fabric strips 294 are integrally formed with the panel pultrusions as part of the pultrusion operation. The fabric strips 294 are preferably a 5 oz./yd.$^2$ woven DACRON material known as PEEL-PLY. It is preferred that each pultruded component of the container 10 be pultruded with an integral fabric strip 294 along every adhesive bonding surface that extends parallel to the pultrusion axis of that component.

The mounting of both side walls 226 and 230 on the frame 246 is the same and will be explained with reference to FIG. 7 and the roadside side wall 226. The side wall 226 is positioned with respect the frame 14 such that it is supported on the tubular portion 30 of one of the lower rails 22 with the outer flange 38 of the lower rail 22 extending upwardly over the lower end of the exterior surface 242. The upper rail 58 is supported on top of the side wall 226 with its outer flange 86 extending downwardly over the exterior surface 242.

Means are provided for securely attaching the side wall 226 to the frame 14. The attachment means preferably includes means that do not intrude into the interior and exterior surfaces 238 and 242 of the side wall 226 for bonding the side wall 226 to the frame 14 so that those surfaces remain uninterrupted. In the illustrated embodiment, the bonding means includes adhesive material A applied between the exterior surface 242 and each of the outer flanges 38 and 86. The sealed joints thus formed between the side wall 226 and the lower and upper rails 22 and 58 are fastenerless to provide a clean, smooth appearance. To seal the upper and lower ends of the side wall 226, lower and upper angle pultrusions 334 and 338 are adhesively bonded between the interior surface 238 and the lower and upper rails 22 and 58, respectively. A pultruded scuff liner 342 is also adhesively bonded to the interior surface 238 above the lower angle pultrusion 338.

To connect the side wall 226 to the front frame assembly 94 (FIG. 28), the male member 270 of the forwardmost side panel 234 is adhesively bonded between the flanges 110 on the corner post 98 to form a joint like the joint 292. Thus, the joint between the side wall 226 and the front frame assembly 94 is also fastenerless.

To connect the side wall 226 to the rear door frame 174, the side wall 226 is provided with non-thermally conductive means for tying or interfacing with the rear door frame 174. In the illustrated embodiment, the interfacing means includes (FIG. 34) a pultruded composite side tie member 346 that also preferably has its filamentary material predominantly oriented in the longitudinal direction to decrease thermal flux thereacross. The side tie member 346 includes a pair of forwardly extending flanges 350 that define a male member sized to interfit with and be adhesively bonded within the female member 274 of the rearmost side panel 234 to produce a joint similar to joint 292.

The side tie member 346 also includes a first and second rearwardly extending portions 354 and 358 overlapping spaced apart inner surfaces on the corner post 190. The portions 354 and 358 are fastened to the post with lag screws 362 and rivets 366 or other suitable means. Adhesive material A is also preferably applied between the rearwardly extending portions 354 and 358 and the roadside rear corner post 190 to seal the joints therebetween.

As shown in FIGS. 1 and 3, the container 10 also comprises a top wall 370 extending generally perpendicularly to the side walls 226 and 230 and between the upper rails 58. The top wall 370 has (FIG. 7) interior and exterior surfaces 374 and 378, respectively, and includes a plurality of modular roof panels 382. As shown in FIG. 15, the roof panels 382 each include a panel member 386 that is thicker than the panel members 246 of the side panels 234 and that includes an integrally formed central web 390. The panel member 386 is otherwise identical to panel members 246 of the side panels 234, and includes male and female members 394 and 398, respectively, for interconnecting adjoining roof panels 382. The joints 402 formed by interfitted male and female members 394 and 398 are preferably identical (except for thickness) to joints 292.

The panel members 386 of the roof panels 382 are also filled with insulation Is and the panel members 386 are preferably constructed in the same manner and with the same materials as the panel members 246 of the side panels 234 to achieve like properties and characteristics. Thus, the panel members 386 are panel pultrusions each having a pultrusion axis 406 and possessing filamentary material oriented predominantly in a direction parallel to the pultrusion axis 406.

To form the top wall 370, the roof panels 382 are assembled in the same manner as described above with respect to the side panels 234. Referring to FIG. 7, the top wall 370 is supported on the flanges 90 (only one side is shown) of the upper rails 58. As with the side walls 226 and 230, the attachment means for fixing the top wall 370 to the frame 246 includes adhesive material A bonding the top wall 370 to the upper rails 58. The adhesive material A is applied between the interior surface 374 of the top wall 370 and the flanges 90 to provide a fastenerless joint that does not penetrate the interior and exterior surfaces 374 and 378 of the top wall 370. To seal the top of the joint between the upper rail 58 and the top wall 370, an elongated pultruded panel 410 is adhesively bonded in place over that joint. The panel 410 is seated partially on the recessed surface portion 82 and extends over onto the exterior surface 378 of the top wall 370.

As shown in FIG. 29, to connect the top wall 370 to the front frame assembly 94, the male member 394 of the forwardmost roof panel 382 is adhesively bonded between the flanges 146 on the upper beam 118. The joint thus formed is also fastenerless and is similar to the joint 402 between adjoining roof panels 382.

The top wall 370 is also provided with non-thermally conductive means for tying with the rear door frame 174. In the illustrated arrangement, such means includes (FIG. 35) a pultruded composite top tie member 414 similar to the side tie member 346. The top tie member 414 includes a pair of forwardly extending flanges 418 that define a male member sized to interfit with and be adhesively bonded within the female member 398 of the rearmost roof panel 382. The top tie member 414 also includes first and second rearwardly extending portions 422 and 426 each overlapping separate inner surfaces of the upper crossmember 186. The portions 422 and 426 are fastened to the upper crossmember 186 with screws 430 and rivets 434, respectively, and adhesive material A is preferably applied between the joints thus formed to seal those joints.

The container also includes (FIGS. 1 and 5) a front wall 438. As shown in FIG. 29, the front wall 438 is made of roof panels 382 that interfit with the male member 154 on the lower beam 122 and the flanges 158 on the intermediate beam 126.

The container 10 further comprises (FIG. 4) a bottom wall 442 extending generally perpendicularly to the side walls 226 and 230 and between the lower rails 22. The bottom wall 442 has interior and exterior surfaces which in the illustrated arrangement are upper and lower surfaces 446 and 450, respectively. As shown in FIG. 7, an aluminum floor 454 is supported on the upper surface 446. The floor 454 includes a cargo supporting surface 458 that is configured to permit air flow beneath the cargo (not shown).

The bottom wall 442, like the side and top walls 226, 230 and 370, is modularly constructed of interconnected floor panels 462. As shown in FIG. 13, each of the floor panels 462 includes a panel member 466 that has a floor section 470. The floor section 470 includes integrally formed intermediate webs 474 and 478 and an integrally formed central web 482 which is thicker in cross-section than the central web 390 of the roof panels 382. The additional webs 474 and 478 and the thickened central web 482 are provided to support heavy loads on the upper surface 446 of the bottom wall 442. Otherwise, the floor sections 470 are preferably identical to the panel members 386 of the top panels 382, and each is provided with male and female members 478 and 486 forming joints 490 between adjoining panels. The joints 490 are preferably identical to the joints 402 between adjoining roof panels 382.

Each floor panel member 466 also includes means for stiffening its floor section 470 to resist bending moments resulting from downwardly directed forces on the upper surface 446 of the bottom wall 442. While various stiffening means can be employed, in the illustrated arrangement such means includes (FIG. 13) a reinforcing section 494 formed as an integral part of the panel member 466. The reinforcing section 494 is generally trapezoidal in shape and includes a pair of legs 498 and 502 that extend downwardly from the floor section 470. The leg members 498 and 502 form extensions of the central web 482 and one of the outer end webs so that the reinforcing section 494 is offset toward one of the joints 490 to also reinforce that joint against bending moments. The reinforcing section 494 also includes a base 506 that is parallel to the sheet members of the floor section 470 and that extends between the lower ends of the leg members 498 and 502.

The floor sections 470 of the floor panels 462 are filled with insulation I, and the floor panels 462 are preferably constructed in the same manner and with the same materials as the panel members 246 and 386. Thus, the panel members 466 are panel pultrusions each having a pultrusion axis 510 and possessing filamentary material oriented predominantly in a direction parallel to the pultrusion axis 510.

To form the bottom wall 370, the roof panels 382 are assembled in the same manner as described above with respect to the side panels 234. Prior to assembly of the bottom wall 370, the floor panels 462 are preferably notched to accommodate the frame 14. As shown in FIG. 14, the ends of each floor section 470 are preferably cut to form 45° notches 514, and the ends of the reinforcing section 494 are cut off to provide outer stepped portions 518. The middle portions of the reinforcing section 494 are also cut on floor panels 462 at the front of the container 10 to provide inner stepped portions 522.

Attachment of one side of the bottom wall 442 to one of the lower rails 22 is shown in FIG. 7o In particular, the lateral end of the bottom wall 442 shown in FIG. 7 fits over the lower rail 22 such that the floor and reinforcing sections 470 and 494 of each floor panel 462 are supported on the upper surface of the tubular portion 30 and the flange 42, respectively. The notches 514 and the outer stepped portions 518 accommodate the angle pultrusion 338 and the tubular portion 30 of the lower rail 22, respectively. As shown best in FIGS. 4 and 5, the inner stepped portions 522 provide space for the channel 170 and the steel members 162 preferably fit over the inner stepped portions 522.

As with the side and top walls 226, 230 and 370, the attaching means for securing the bottom wall in place is fastenerless and includes adhesive material A. The adhesive material A is applied between the flange 42 and the lower surface of the reinforcing sections 494, and can also be provided between the floor section 470 and the upper surface of the tubular portion 30, if desired.

As shown in FIG. 29, to connect the bottom wall 370 to the front frame assembly 94, the male member 478 of the forwardmost floor panel 462 is adhesively bonded between the flanges 150 of the lower beam 122. The joint thus formed is also fastenerless and is similar to joint 490.

To connect the bottom wall 370 to the rear door frame 174 (FIG. 33), adhesive material A is applied between the rearmost floor panel 462 and the lower crossmember 178. A resilient ramp 530 is also provided to form a smooth transition between the lower door sill 182 and the aluminum floor 454. The ramp 530 is supported on a plate 534 that is riveted to the lower crossmember 178.

The container 10 also comprises means for supporting one or more additional containers C (a portion of one of which is schematically shown in FIG. 1) thereon so that the container 10 can be positioned in a vertically stacked arrangement with other containers. While various supporting means can be employed, in the illustrated arrangement the supporting means includes (FIGS. 1–3) two stacking frame assemblies 538 which each form part of the frame 14. The stacking frame assemblies 538 are positioned at spaced intermediate locations, and are preferably spaced inwardly from the ends of the container 10 so that the container 10 can be stacked interchangeably with other domestic containers or with ISO containers, as will be understood by one skilled in the art.

Each of the stacking assemblies 538 includes a pair of stacking posts 542 positioned directly opposite one another in one of the side walls 226 and 230. The stacking posts 542 are preferably identical and one is illustrated in FIG. 12. The illustrated stacking post 542 is contained within the confines of the side wall 226 and includes outwardly facing surfaces 546 and 550 and an inwardly facing surface 554 that form parts of the interior and exterior surfaces 238 and 242, respectively. Thus, in the illustrated arrangement the overall thickness of the stacking post 542 is no greater than the thickness of the side wall 226. The stacking post 542 also includes a recessed surface 558.

To integrate the stacking posts 542 as modular parts of the side walls 226 and 230, each stacking post 542 is provided with means for interfitting with the side panels 234. While various interfitting means can be employed, in the embodiment illustrated in FIG. 26 the interfitting means includes sets of spaced apart sets of flanges 562 and 566. The flanges 562 and 566 form male and female members on the opposite ends of the stacking post 542 that are configured to interfit with the female and male members 274 and 270 of adjoining side panels 234 to form joints similar to joints 292.

The stacking posts 542 substantially support the weight of any container(s) C stacked on top of the container 10. To impart the needed strength to the stacking posts 542, each is preferably made of the aforementioned composite material and is formed as a post pultrusion having a vertically extending pultrusion axis 570. As with the aforementioned pultruded parts, the post pultrusion has a multi-directional array of filamentary material with a predominance of the fibers oriented parallel to the pultrusion axis 570 to achieve the aforementioned desired structural and thermal advantages. In the arrangement illustrated in FIG. 12 the pultruded stacking post 542 are generally tubular and are filled with insulation I.

Each stacking frame assembly 538 also includes (FIGS. 1 and 3) a horizontal crossmember or beam 574 within the confines of the top wall 370. As shown in FIG. 16, the horizontal beam 574 includes inwardly facing surfaces 578 and 582 and an outwardly facing surface 586 that form parts of the interior and exterior surfaces 374 and 378, respectively. The horizontal beam 574 also includes a recessed surface 590, and is preferably pultruded of composite material to achieve thermal and structural advantages similar to the other pultruded frame components.

To interface with adjoining roof panels 382 to form a modular part of the top wall 370, the horizontal beam 574 includes (FIG. 16) sets of flanges 594 and 598 that act as male and female members to interfit with the adjoining roof panels 382 to form joints like joints 402.

Each of the stacking frame assemblies 538 is also provided with means for connecting the container 10 to a container stacked thereabove. While various connecting means can be employed, in the illustrated arrangement the connecting means includes (FIGS. 1-3) two upper intermediate connector assemblies 610 each positioned at an intersection of one of the corner posts 542, the beam 574, and one of the upper rails 58. Each upper connector assembly 610 includes a hollow upper locking element receiving fitting 614 which in the illustrated arrangement is a standard fitting used for intermediate locations.

Since the frame components are made of composite material conventional means (i.e., weldment) cannot be used to secure the fitting 614 in place on the container 10. Accordingly, each upper connector assembly 610 is provided with means for mounting a fitting 614 on the container 10. In the illustrated embodiment the mounting means includes lap joint means for attaching the fitting 614 to one of the stacking posts 542. Referring to FIGS. 17-23, the lap joint means for attaching the fitting 614 to one of the stacking posts 542 includes a pair of spaced apart metal splice plates 618 and reinforcing plates 622. To attach the plates 618 and 622 to the fitting, the lower edges of the splice plates 618 are preferably ground off to provide a pocket which is filled with weldment 626 (FIG. 23).

As shown in FIGS. 18 and 19, the splice plates 618 overlap one of the stacking posts 542 so that the post is sandwiched therebetween to form a double lap joint. That lap joint is provided with a layer of adhesive material A between each of the splice plates 618 and the stacking post 542 to provide a tight, sealed union between those parts. To prevent the splice plates 618 from increasing the overall width of the container 10, the outer one of the splice plates 618 is seated on the recessed surface 558.

The mounting means also includes second, third and fourth lap joint means for attaching the fitting 614 to the top beam 574 and to one of the upper rails 58. In the illustrated arrangement the second, third and fourth lap joint means include tubular members 630, 634 and 638, respectively. The tubular members 630, 634 and 638 are received in the top beam 574 and in the upper rail 58 to form telescopic lap joints. Adhesive material A is applied at each of those joints to provide a sealed secure union.

To reinforce the tubular members 630, 634 and 638, shortened reinforcing tubes 642 are provided. To attach the tubular members to the fitting 614, the lower edge of the associated reinforcing tube 642 is first ground off as indicated by the line 646 in FIG. 24. The pocket thus formed is then filled with weldment 650 (FIG. 22) to attach both the tubular member and the reinforcing tube 634 to the fitting 614.

The adhesive material A at each of the aforementioned lap joints absorbs shear loads and provides a zero tolerance or "no-slop" joint as well as sufficient stiffness to prevent any loads from "peeling" the lap joints apart. To provide further support, each of the lap joint means also includes optional clamping means for reinforcing the lap joints. In the illustrated arrangement, each of the clamping means includes fasteners 654, such as nuts and bolts, extending through the joints. The clamping means at the telescopic joints also include (FIGS. 17-19) sets of metal clamping plates 658, 662 and 666. To support the stacking post 542 against the compressive loads resulting when the fasteners 654 are tightened, reinforcing means is provided at the double lap joint formed by the splice plates 618. As shown in FIG. 19, the reinforcing means includes a block 670 made of wood or other suitable material and inserted into the upper end of the stacking post 542 directly between the splice plates 618.

Each of the stacking frame assemblies 538 is also provided with means for connecting the container 10 to another container (not shown) on which the container 10 is stacked. In the embodiment illustrated in the drawings, the means for connecting the container 10 to a lower container includes (FIG. 4) a pair of lower intermediate connector assemblies 674 at the intersections of the stacking posts 542 with the lower rails 22.

Figure 27:
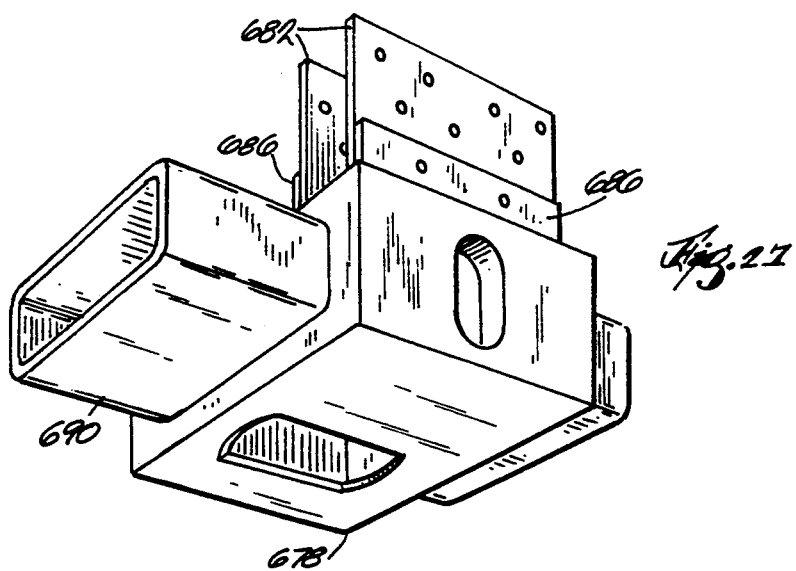
FIG. 27 is a perspective view of the bottom intermediate connector assembly forming part of the installation illustrated in FIG. 25.
Figure 26:
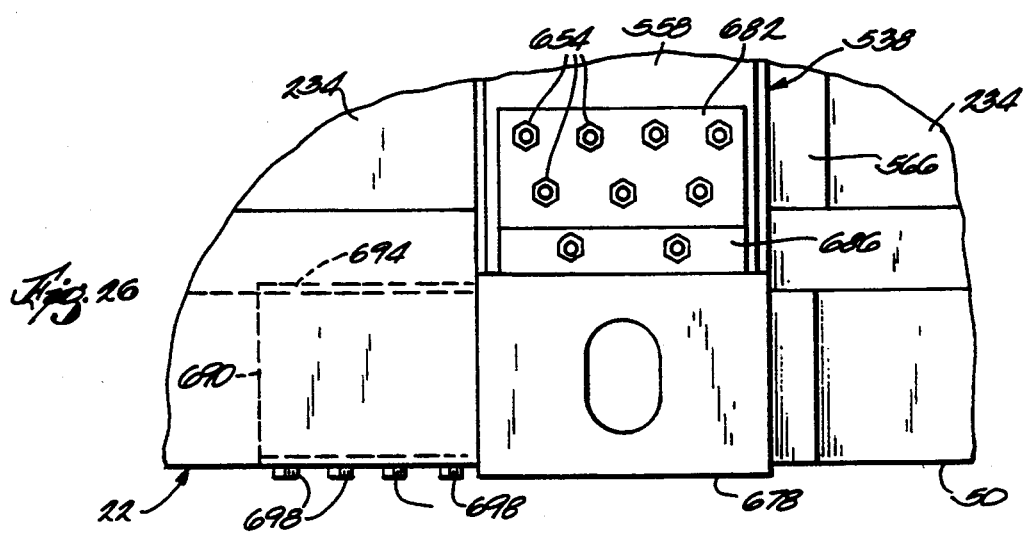
FIG. 26 is a side elevational view of the bottom intermediate connector installation illustrated in FIG. 25.
Figure 25:
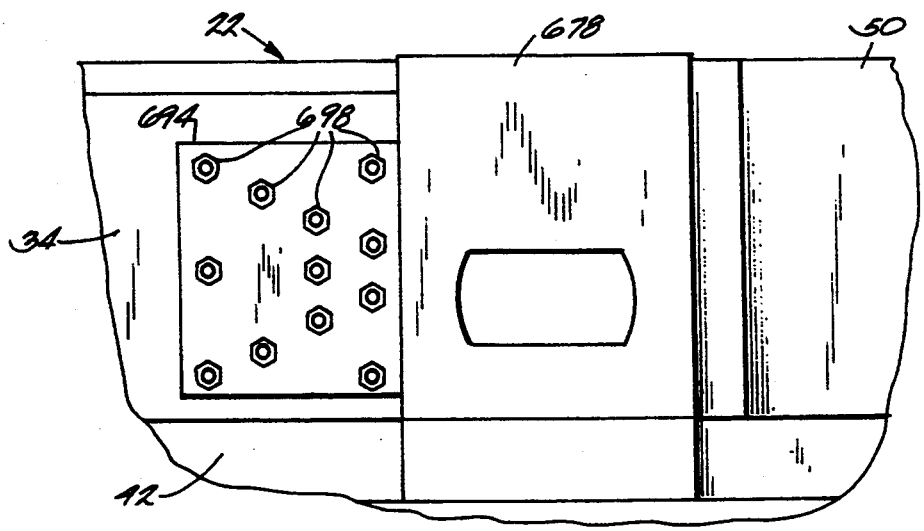
FIG. 25 is an enlarged view of a portion of the container illustrated in FIG. 4 and showing a bottom intermediate connector installation.

Referring to FIGS. 25-27, each lower connector assembly 674 includes a standard lower fitting 678 and first lap joint means for attaching the fitting 678 to the lower end of one of the stacking posts 542. In the illustrated arrangement, such means includes splice plates 682 and reinforcing plates 686 that extend upwardly over the stacking post 542 from the top surface of the fitting 678. The double lap joint thus formed is preferably substantially identical to the double lap joint formed by the splice plates 618 of the upper intermediate connector assembly 610. Additional clamping fasteners 654 are also provided to reinforce the adhesive bond at the double lap joint formed by splice plates 682.

The lower connector assembly 674 is also provided with a tubular member 690 that is preferably welded to the lower fitting 678 using the same technique as described above with respect to attaching tubular members 630, 634 and 638 to the upper fitting 614. The tubular member 690 is received within one of the lower rails 22 and is adhesively bonded thereto to form another telescopic joint. As shown in FIGS. 25 and 26, that joint is provided with a pair of clamping plates 694 extending over the upper and lower surfaces of one of the lower rails and clamped thereto with fasteners 698 to reinforce the joint.

To manufacture the container 10, elongated specimens having desired cross-sectional shapes are pultruded and cut to appropriate lengths to form the various pultrusions used to assemble the container 10. Preferably, fabric strips 294 are integrally incorporated into each pultrusion on all surfaces that extend along the axis of pultrusion and that form bonding surfaces. To finish the pultruded parts, those that are to be insulated are filled with insulation I by spraying liquified foam into the pultrusions and allowing the foam to expand and cure.

With the necessary parts on hand, the side, top and bottom walls 226, 230, 370 and 442 are assembled by removing fabric strips 294 from corresponding male and female members and interfitting and bonding those members together in the manner set forth above. For purpose of assembly, the stacking posts 542 are treated as side panels 234 and the beam 574 is treated as a roof panel 382.

The frame 14 is preferably assembled in sections including the front frame assembly 94 and the rear door frame 174, and the lower and upper rails 22 and 58 are bonded to the side panels 234 to form side wall assemblies. Upon completion of the top and bottom walls 370 and 442, the side wall assemblies are positioned on opposite sides of the bottom wall 320 and are adhesively bonded thereto as described above. The aluminum floor section 454 can be installed before or after mounting the side wall assemblies on the bottom wall 442. Thereafter, the top wall 370 is placed on the upper rails 58 and bonded thereto, and the front frame assembly 94 and the rear door frame 174 are interfitted and bonded to the side, top and bottom walls 226, 230, 370 and 374 as previously described.

Figure 38:
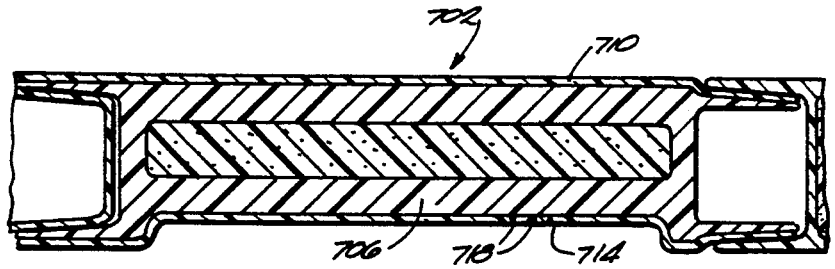
FIGS. 38–41 are cross-sectional views similar to FIG. 12 and showing alternative stacking post configurations.

Illustrated in FIGS. 38–41 are portions of side walls including alternative stacking post configurations. In particular, composite stacking posts can be customized for optimum performance in a variety of applications, and can be pultruded or otherwise produced as hybrids, if desired. For example, FIG. 38 illustrates a multi-layered stacking post 702 having a core or inner layer 706 which is configured similarly to stacking posts 542, and outer layers 710 and 714 sandwiching the inner layer 706. In the illustrated arrangement, the stacking post 702 is formed throughout its cross-section with a single resin binder material, but has different filamentary materials occupying the separate layers. All of the filamentary material is preferably predominantly oriented in the lengthwise direction of the stacking post 702 (i.e., parallel to its axis of pultrusion).

In one embodiment, the outer layers 710 and 714 include carbon fibers 718 that have a modulus which is greater than that of the glass fibers in the inner layer 706 to increase the column stability and stiffness of the stacking post 702. This provides the stacking post 702 with increased load bearing ability. A suitable application for stacking post 702 is in insulated or refrigerated ISO containers which may be vertically stacked several high.

Figure 39:
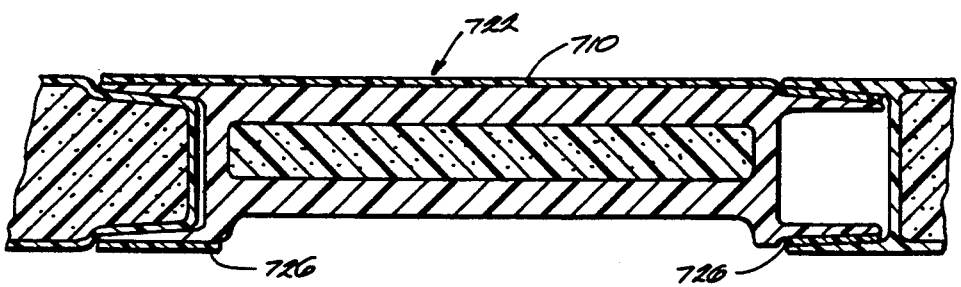

Illustrated in FIG. 39 is a stacking post 722 which is similar to stacking post 702, but which includes a discontinuous outer layer 726. This arrangement is expected to provide column stiffness and thermal performance intermediate that of stacking posts 542 and 702.

Figure 40:
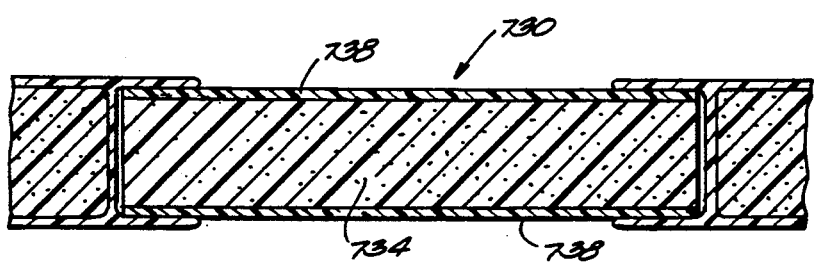

Illustrated in FIG. 40 is a stacking post 730 which is pultruded, or otherwise formed, as a solid multi-layered plank. The stacking post 730 is contemplated for use in intermodal containers in which minimum wall thickness and maximum interior dimensions are desired, such as in non-insulated ISO containers. In the illustrated embodiment, stacking post 730 includes an inner layer 734 of composite material including glass fibers and outer layers 738 of composite material including carbon fibers.

Figure 41:
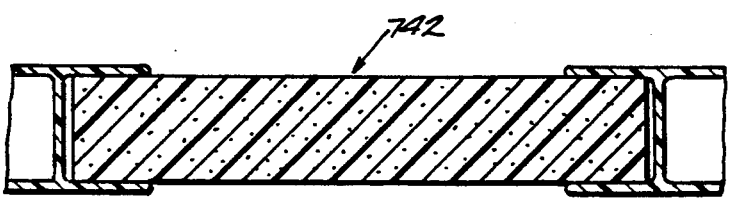

Illustrated in FIG. 41 is a stacking post 742 including a single layer of composite material having glass fibers. Stacking post 742 might be used, for example, in non-insulated domestic containers.

Illustrated in FIGS. 42–46 is a container 746 in accordance with a second embodiment of the invention. The container 746 is an insulated ISO container which is not provided with an opening to accommodate a refrigeration unit and which is not configured to receive a trailer chassis. Otherwise, the container 746 is similar in many respects to the container 10, and the same reference numerals are used for common components.

The container 746 includes a front stacking frame assembly 750 at the front end of the container 746. The stacking frame assembly 750 includes a pair of stacking posts 754 that are positioned at the front corners of the container 746. As shown in FIG. 46, the stacking posts 754 are similar to the stacking posts 542 used in container 10 except that the stacking posts 754 have had the set of flanges 598 removed therefrom. Instead, the stacking posts 754 each include an angle pultrusion 758 adhesively bonded to the inner surface thereof, and a plate pultrusion 762. To accommodate the angle pultrusion 758, each of the roof panels 382 in the front wall is provided with notches 766.

Various features and advantages of the invention are set forth in the following claims.

We claim:

1. A vehicle body comprising
a top wall,
a bottom wall,
opposite side walls extending between said top and bottom walls,
each of said walls including a plurality of modular panel members adjoining one another in series relation to form joints therebetween, each of said panel members including a pair of spaced apart sheet members, a pair of spaced apart webs integrally interconnecting said sheet members, and integral means for interfitting with adjoining ones of said panel members, said means for interfitting including a lengthwise extending female member including one of said webs and a pair of opposite tapered surfaces converging inwardly to said one web to define a wedge-shaped channel, and a complementary lengthwise extending wedge-shaped male member including the other of said webs and a pair of opposite tapered surfaces converging inwardly to said other web, said male member of each of said panel members being insertable into said channel of a corresponding one of said female members of an adjoining one of said panel members to form one of said joints, and
means for bonding together adjoining ones of said panel members, said means for bonding including an adhesive material in each of said joints,
wherein fit-up of a pair of said panel members having a corresponding pair of said male and female members is accomplished by applying said adhesive material to at least one of said opposite tapered surfaces on one of said male and female members in said corresponding pair and inserting said male member of said corresponding pair into said female member of said corresponding pair so that said tapered surfaces of said corresponding pair of male and female members cooperate to spread said adhesive material into a uniform layer therebetween and to minimize adhesive wipe-off.

2. A vehicle body as set forth in claim 1 wherein each of said top wall and said side walls includes an interior surface and an exterior surface contained within a pair of spaced apart parallel planes, wherein each of said sheet members of each of said panel members in said top and side walls includes an outwardly facing surface that forms a portion of one of said interior and exterior surfaces thereof, and wherein said joints in each of said top and side walls are confined entirely between said parallel planes thereof.

3. A vehicle body as set forth in claim 2 wherein said means for bonding is nonintrusive into said panel members, and is confined between said parallel planes of one of said top and side walls.

4. A vehicle body as set forth in claim 1 wherein each one of said joints includes means for guiding a cutting tool so that adjoining ones of said panel members can be separated from one another, said means for guiding a cutting tool defining an interior gap within said one joint.

5. A vehicle body as set forth in claim 1 wherein each of said male members and said channels of said female members has a depth in a lateral direction, and wherein the depth of each of said channels is greater than the depth of each of said male members so that corresponding ones of said male and female members form a laterally extending gap therebetween.

6. A vehicle body as set forth in claim 1 wherein said webs of the corresponding ones of said female and male members at each of said joints are laterally spaced apart and define therebetween an interior reservoir for receiving excess adhesive material.

7. A vehicle body as set forth in claim 1 wherein each of said panel members is a panel pultrusion made of a composite material, each of said panel pultrusions including removable means for providing a roughened bonding surface for said adhesive material, said removable means for providing a roughened bonding surface including a fabric material integrally pultruded as part of said panel pultrusion.

8. A vehicle body as set forth in claim 1 wherein each of said panel members of each of said walls is made of a fiber reinforced plastic composite material and is formed by pultrusion so that each of said panel members is an integrally formed and seamless one-piece member.

9. A vehicle body as set forth in claim 1 wherein said vehicle body includes a frame supporting said walls, wherein said frame includes a plurality of horizontal members and vertical members, and wherein at least some of said horizontal and vertical members include one of a female member and a male member so that said at least some of the horizontal members and vertical members can be interfitted with said panel members as part of one of said walls.

10. A wall assembly comprising
first and second panel pultrusions, said first and second panel pultrusions each including a longitudinal pultrusion axis, said axes being parallel to one another, and each of said panel pultrusions including laterally spaced apart sides,
means for forming a joint between said first and second panel pultrusions, said means for forming a joint including an integral wedge-shaped male member formed on said first panel pultrusion, said male member extending parallel to said pultrusion axes, and said male member including a pair of outwardly facing tapered surfaces converging inwardly toward one of said sides of said first panel pultrusion, and a complementary integral female member on said second panel pultrusion, said female member including opposing inwardly facing tapered surfaces converging inwardly to one of said sides of said second panel pultrusion to define a tapered channel extending parallel to said pultrusion axes, said male member being insertable into said channel of said female member, and
an adhesive material, said adhesive material being located between one of said tapered surfaces of said female member and one of said tapered surfaces of said male member, and between the other of said tapered surfaces of said female member and the other of said tapered surfaces of said male member to form a double seal at said joint, wherein said tapered surfaces of said male and female members cooperate to spread said adhesive material into a pair of uniform layers between said male and female members when said male member is inserted into said female member.

11. A wall assembly as set forth in claim 10 wherein said means for forming a joint between said first and second panel pultrusions includes means for defining a guide for a cutting tool so that said first and second panel pultrusions can be separated, said means for defining a guide including said one side of each of said first and second panel pultrusions, said one side of each of said first and second panel pultrusions defining an interior gap within said joint.

12. A wall assembly as set forth in claim 10 wherein each of said first and second panel pultrusions is made of a composite material, and each of said first and second panel pultrusions includes removable means for providing a roughened bonding surface for said adhesive material, said removable means for providing a roughened bonding surface including a fabric material integrally pultruded as part of said panel pultrusions.

13. A wall assembly as set forth in claim 12 wherein said first and second panel pultrusions are pultruded with said fabric material over each of said tapered surfaces of each of said male and female members.

14. A wall assembly as set forth in claim 10 wherein said one side of each of said first and second panel members are laterally spaced from each other and define therebetween an interior reservoir for receiving excess adhesive material.

15. A wall assembly as set forth in claim 10 wherein said male member forms an interference fit with said female member so that said one side of each of said first and second panel pultrusions are prevented from contacting one another.

16. A vehicle body comprising
a plurality of wall assemblies interconnected to define an interior space, each of said wall assemblies including
a plurality of modular panel pultrusions adjoining one another in series relation to form joints therebetween, each of said panel pultrusions being made of a composite material, and each of said panel pultrusions including a pair of spaced apart sheet members, a pair of spaced apart webs integrally interconnecting said sheet members, and integral means for interfitting with adjoining ones of said panel pultrusions, said means for interfitting including an integral lengthwise extending female member including one of said webs, and a pair of opposite tapered surfaces converging inwardly to said one web, and a complementary integral lengthwise extending wedge-shaped male member including the other of said webs, and a pair of opposite tapered surfaces converging inwardly to said other web, said male member of each of said panel pultrusions being insertable into a corresponding one of said female members of an adjoining one of said panel pultrusions to form one of said joints, and
means for bonding together adjoining ones of said panel pultrusions, said means for bonding including an adhesive material in each of said joints.

17. A wall assembly as set forth in claim 16 wherein each one of said joints includes means for guiding a cutting tool so that adjoining ones of said panel pultrusions can be separated from one another, said means for guiding a cutting tool defining an interior gap within said one joint.

18. A wall assembly as set forth in claim 16 wherein each of said male member and said female member of each of said panel pultrusions has a depth in a lateral direction, and wherein the depth of each of said female members is greater than the depth of the corresponding one of said male members so that the corresponding ones of said male and female members form a laterally extending gap therebetween, and wherein said gap is defined between said webs of the corresponding ones of said male and female members.

19. A wall assembly as set forth in claim 16 wherein said webs of the corresponding ones of said female and male members at each of said joints are laterally spaced apart and define therebetween an interior reservoir for receiving excess adhesive material.

20. A wall assembly as set forth in claim 16 wherein each of said panel pultrusions includes removable means for providing a roughened bonding surface for said adhesive material, said removable means for providing a roughened bonding surface including a fabric material integrally pultruded as part of each of said panel pultrusions, said fabric material extending over each of said tapered surfaces of said male and female members of each of said panel pultrusions.

* * * * *